(12) United States Patent
Reevell

(10) Patent No.: US 11,896,061 B2
(45) Date of Patent: Feb. 13, 2024

(54) AEROSOL GENERATION DEVICE, AND HEATING CHAMBER THEREFOR

(71) Applicant: JT International S.A., Geneva (CH)

(72) Inventor: Tony Reevell, London (GB)

(73) Assignee: JT International S.A.

( * ) Notice: Subject to any disclaimer, the term of this patent is extended or adjusted under 35 U.S.C. 154(b) by 421 days.

(21) Appl. No.: 17/283,828

(22) PCT Filed: Oct. 9, 2019

(86) PCT No.: PCT/EP2019/077414
§ 371 (c)(1),
(2) Date: Apr. 8, 2021

(87) PCT Pub. No.: WO2020/074611
PCT Pub. Date: Apr. 16, 2020

(65) Prior Publication Data
US 2021/0378318 A1 Dec. 9, 2021

(30) Foreign Application Priority Data
Oct. 12, 2018 (EP) .................................. 18200269

(51) Int. Cl.
*A24F 40/20* (2020.01)
*A24F 40/70* (2020.01)
(Continued)

(52) U.S. Cl.
CPC .............. *A24F 40/70* (2020.01); *A24F 40/20* (2020.01); *A24F 40/46* (2020.01); *A24F 40/57* (2020.01);
(Continued)

(58) Field of Classification Search
None
See application file for complete search history.

(56) References Cited

U.S. PATENT DOCUMENTS 4,499,042 A    2/1985  Ishizuka et al.
5,224,498 A *  7/1993  Deevi ..................... A24F 40/46
                                                        131/194
(Continued)

FOREIGN PATENT DOCUMENTS

CN      103720056 A    4/2014
JP      S56-118421 A   9/1981
(Continued)

OTHER PUBLICATIONS

International Search Report for Application No. PCT/EP2019/077414, dated Dec. 19, 2019, 4 pages.

*Primary Examiner* — Tho D Ta
(74) *Attorney, Agent, or Firm* — Lerner David LLP

(57) ABSTRACT

A method of constructing a heating chamber for an aerosol generation device includes providing a side wall of the heating chamber, providing a heater, and arranging the heater to be in thermal contact with the side wall of the heating chamber. The method may also include attaching a heat shrink layer to the outward facing side of the heater, and heating the heat shrink layer to a temperature such that the heat shrink layer contracts to compress the heater against the side wall. The heating chamber for the aerosol generation device includes a side wall defining an interior volume of the heating chamber, and a heater in thermal contact with the side wall, as well as a heat shrink layer under tension, compressing the heater against an outwardly facing surface of the side wall.

23 Claims, 16 Drawing Sheets

(51) Int. Cl.
*A24F 40/46* (2020.01)
*A24F 40/57* (2020.01)
*B29C 63/40* (2006.01)
*H05B 1/02* (2006.01)
*H05B 3/48* (2006.01)
*B29L 31/00* (2006.01)

(52) U.S. Cl.
CPC ........... *B29C 63/40* (2013.01); *H05B 1/0244* (2013.01); *H05B 3/48* (2013.01); *B29L 2031/7414* (2013.01); *B29L 2031/779* (2013.01); *H05B 2203/017* (2013.01)

(56) References Cited

U.S. PATENT DOCUMENTS

| | | | |
|---|---|---|---|
| 2006/0027536 A1* | 2/2006 | Kornrumpf | F16L 47/03 |
| | | | 219/50 |
| 2014/0345634 A1 | 11/2014 | Zuber et al. | |
| 2015/0181935 A1* | 7/2015 | Lyubomirskiy | A24F 40/46 |
| | | | 392/386 |
| 2015/0181936 A1* | 7/2015 | Lyubomirskiy | H05B 3/42 |
| | | | 219/553 |
| 2016/0338412 A1 | 11/2016 | Monsees et al. | |
| 2018/0132536 A1 | 5/2018 | Henry, Jr. | |
| 2021/0307390 A1* | 10/2021 | Reevell | A24F 40/20 |
| 2021/0345673 A1* | 11/2021 | Reevell | A24F 40/20 |
| 2021/0352966 A1* | 11/2021 | Reevell | A24F 40/46 |
| 2021/0378307 A1* | 12/2021 | Reevell | A24F 40/70 |
| 2021/0378308 A1* | 12/2021 | Reevell | A24F 40/51 |
| 2021/0378309 A1* | 12/2021 | Reevell | A24F 40/46 |
| 2022/0046990 A1* | 2/2022 | Reevell | A24F 40/46 |

FOREIGN PATENT DOCUMENTS

| | | |
|---|---|---|
| JP | 2009-103253 A | 5/2009 |
| JP | 2012-12035 A | 1/2012 |
| JP | 2014-524313 A | 9/2014 |
| JP | 2018-522551 A | 8/2018 |
| RU | 2609191 C2 | 1/2017 |
| WO | 2013025921 A1 | 2/2013 |
| WO | 2016207407 A1 | 12/2016 |
| WO | 2017114760 A1 | 7/2017 |
| WO | 2019171331 A2 | 9/2019 |

* cited by examiner

AEROSOL GENERATION DEVICE, AND HEATING CHAMBER THEREFOR

CROSS-REFERENCE TO RELATED APPLICATIONS

The present application is a national phase entry under 35 U.S.C. § 371 of International Application No. PCT/EP2019/077414, filed Oct. 9, 2019, published in English, which claims priority to European Application No. 18200269.1 filed Oct. 12, 2018, the disclosures of which are incorporated herein by reference.

FIELD OF THE DISCLOSURE

The present disclosure relates to an aerosol generation device and to a heating chamber therefor. The disclosure is particularly applicable to a portable aerosol generation device, which may be self-contained and low temperature. Such devices may heat, rather than burn, tobacco or other suitable materials by conduction, convection, and/or radiation, to generate an aerosol for inhalation.

BACKGROUND TO THE DISCLOSURE

The popularity and use of reduced-risk or modified-risk devices (also known as vaporisers) has grown rapidly in the past few years as an aid to assist habitual smokers wishing to quit smoking traditional tobacco products such as cigarettes, cigars, cigarillos, and rolling tobacco. Various devices and systems are available that heat or warm aerosolisable substances as opposed to burning tobacco in conventional tobacco products.

A commonly available reduced-risk or modified-risk device is the heated substrate aerosol generation device or heat-not-burn device. Devices of this type generate an aerosol or vapour by heating an aerosol substrate that typically comprises moist leaf tobacco or other suitable aerosolisable material to a temperature typically in the range 150° C. to 300° C. Heating an aerosol substrate, but not combusting or burning it, releases an aerosol that comprises the components sought by the user but not the toxic and carcinogenic by-products of combustion and burning. Furthermore, the aerosol produced by heating the tobacco or other aersolisable material does not typically comprise the burnt or bitter taste resulting from combustion and burning that can be unpleasant for the user and so the substrate does not therefore require the sugars and other additives that are typically added to such materials to make the smoke and/or vapour more palatable for the user.

In general terms it is desirable to rapidly heat the aerosol substrate to, and to maintain the aerosol substrate at, a temperature at which an aerosol may be released therefrom. It will be apparent that the aerosol will only be released from the aerosol substrate and delivered to user the when there is air flow passing through the aerosol substrate.

Aerosol generation device of this type are portable devices and so energy consumption is an important design consideration. The present invention aims to address issues with existing devices and to provide an improved aerosol generation device and heating chamber therefor.

SUMMARY OF THE DISCLOSURE

According to a first aspect of the disclosure, there is provided a method of constructing a heating chamber for an aerosol generation device comprising the steps of:

providing a side wall of the heating chamber;
providing a heater;
arranging the heater to be in thermal contact with the side wall of the heating chamber;
attaching a heat shrink layer to the outward facing side of the heater;
heating the heat shrink layer to a temperature such that the heat shrink layer (146) contracts to compress the heater against the side wall.

Optionally, the heat shrink layer is a layer of heat shrink tape wrapped around the side wall.

Optionally, the heat shrink layer contracts only along the length of the tape in response to heating.

Optionally, the heat shrink layer wraps around the heater, and preferably wherein after heating, the heat shrink layer conforms to the shape of the side wall and the heater.

Optionally, after heating, the heat shrink layer exerts a homogeneous force on the heater.

Optionally, the step of heating the heat shrink layer results in between 5% and 12% contraction in length, preferably 8% contraction in length.

Optionally, the heat shrink layer is attached to the heater using a silicone adhesive or a silicone adhesive based tape.

Optionally, heating the heat shrink layer to 150° C. for approximately 8 minutes results in a contraction of about 8% in length.

Optionally, heating the heat shrink layer to 350° C. for approximately 8 minutes results in a contraction of about 12% in length.

Optionally, the step of heating the heat shrink layer comprises heating the heat shrink layer to a temperature not higher than the melting point of the silicone adhesive so as to cause the heat shrink layer to contract, and then further heating the heat shrink layer to an operational temperature of the device.

Optionally, the step of arranging the heater to be in thermal contact with the side wall, and attaching a heat shrink layer to the outward facing side of the heater comprises first attaching a heat shrink layer to the heater, and then attaching the combination of the heat shrink layer and the heater to the side wall.

Optionally, an end of the heat shrink layer is attached to an end of the heater using adhesive tape, or wherein the outward facing side of the heater is attached to an inward facing side of the heat shrink layer using an adhesive layer.

Optionally, the step of attaching the heat shrink layer to the heater comprises wrapping the heat shrink layer at least two full rotations around the side wall, at the position where the heater is in thermal contact with the side wall.

Disclosed herein is a heating chamber produced in accordance with the method of described above.

According to a second aspect of the disclosure there is provided a heating chamber for an aerosol generation device, the heating chamber comprising:

a side wall defining an interior volume of the heating chamber;
a heater in thermal contact with the side wall; and
a heat shrink layer under tension, compressing the heater against an outwardly facing surface of the side wall.

Optionally, the heat shrink layer is wrapped around the side wall for at least two full rotations at the position where the heater is in thermal contact with the side wall.

Optionally, the side wall and the heat shrink layer together hermetically seal the heater.

Optionally, the side wall is tubular and the heat shrink layer extends all the way around the outwardly facing surface of the side wall.

Optionally, the heat shrink layer is a layer of heat shrink tape wrapped around the side wall.

Optionally, the heat shrink layer is configured to contract only along the length of the tape in response to heating.

Optionally, the heat shrink layer comprises polyimide.

Optionally, the heat shrink layer has a thickness of 50 μm or less, and preferably 25 μm or less.

Optionally, the heat shrink layer has a thermal conductivity lower than that of the side wall.

Optionally, further comprising a thermistor, and preferably wherein the thermistor is covered by the heat shrink material and preferably wherein the heat shrink material compresses the thermistor against the outwardly facing surface of the side wall.

According to a third aspect of the disclosure, there is provided an aerosol generation device, comprising:
an electrical power source;
the heating chamber as detailed above; and
control circuitry arranged to control the supply of electrical power from the electrical power source to the heater.

DETAILED DESCRIPTION OF THE EMBODIMENTS

First Embodiment

Figure 1:
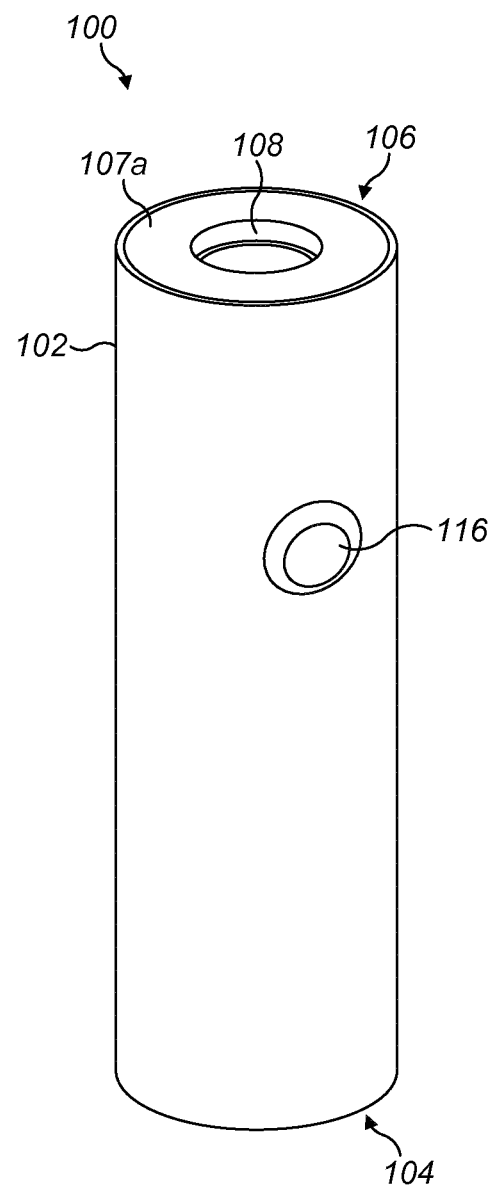
FIG. 1 is a schematic perspective view of an aerosol generation device according to a first embodiment the disclosure.
Figure 2:
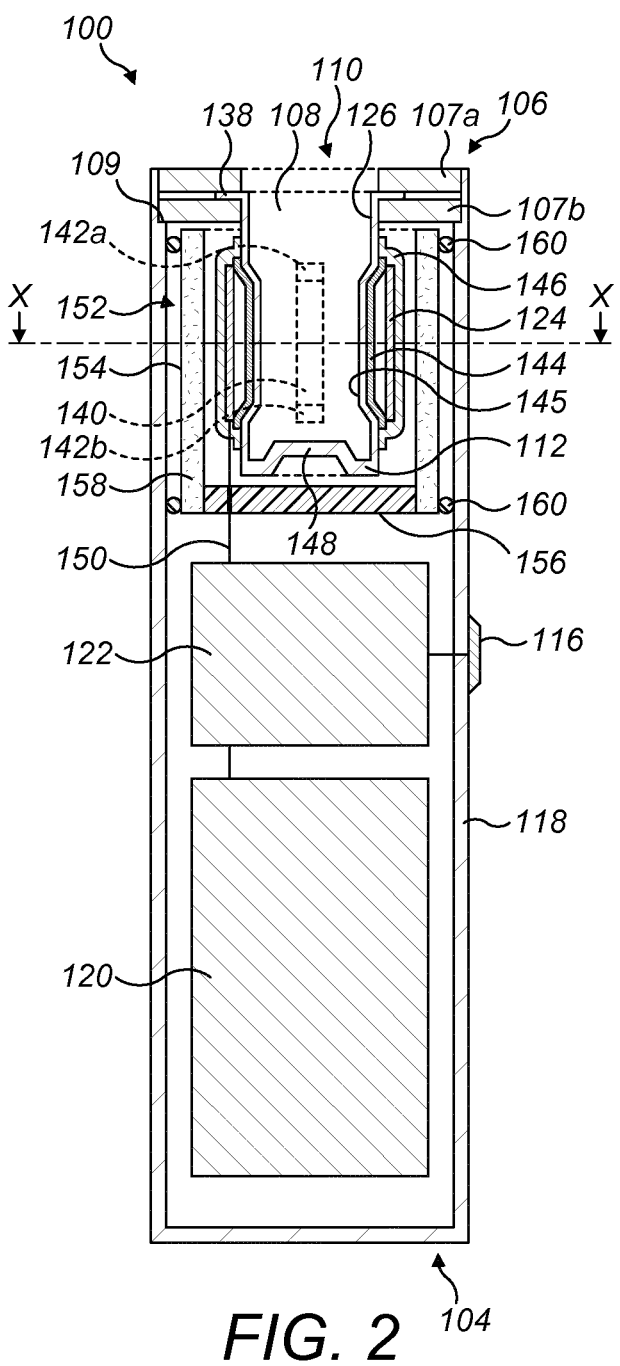
FIG. 2 is a schematic cross-sectional view from a side of the aerosol generation device of FIG. 1.
Figure 2A:
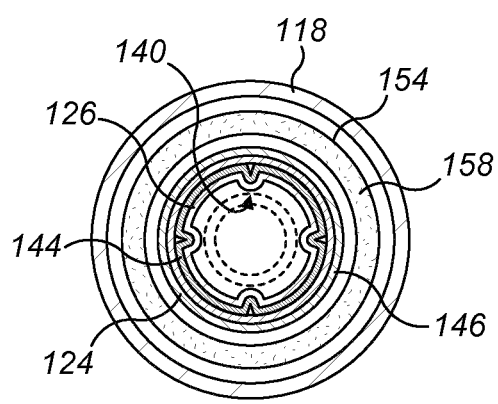
FIG. 2(a) is a schematic cross-sectional view from the top of the aerosol generation device of FIG. 1, along line X-X shown in FIG. 2.

Referring to FIGS. 1 and 2, according to a first embodiment of the disclosure, an aerosol generation device 100 comprises an outer casing 102 housing various components of the aerosol generation device 100. In the first embodiment, the outer casing 102 is tubular. More specifically, it is cylindrical. Note that the outer casing 102 need not have a tubular or cylindrical shape, but can be any shape so long as it is sized to fit the components described in the various embodiments set out herein. The outer casing 102 can be formed of any suitable material, or indeed layers of material. For example an inner layer of metal can be surrounded by an outer layer of plastic. This allows the outer casing 102 to be pleasant for a user to hold. Any heat leaking out of the aerosol generation device 100 is distributed around the outer casing 102 by the layer of metal, so preventing hotspots, while the layer of plastic softens the feel of the outer casing 102. In addition, the layer of plastic can help to protect the layer of metal from tarnishing or scratching, so improving the long term look of the aerosol generation device 100.

A first end 104 of the aerosol generation device 100, shown towards the bottom of each of FIGS. 1 to 6, is described for convenience as a bottom, base or lower end of the aerosol generation device 100. A second end 106 of the aerosol generation device 100, shown towards the top of each of FIGS. 1 to 6, is described as the top or upper end of the aerosol generation device 100. In the first embodiment, the first end 104 is a lower end of the outer casing 102. During use, the user typically orients the aerosol generation device 100 with the first end 104 downward and/or in a distal position with respect to the user's mouth and the second end 106 upward and/or in a proximate position with respect to the user's mouth.

Figure 3:
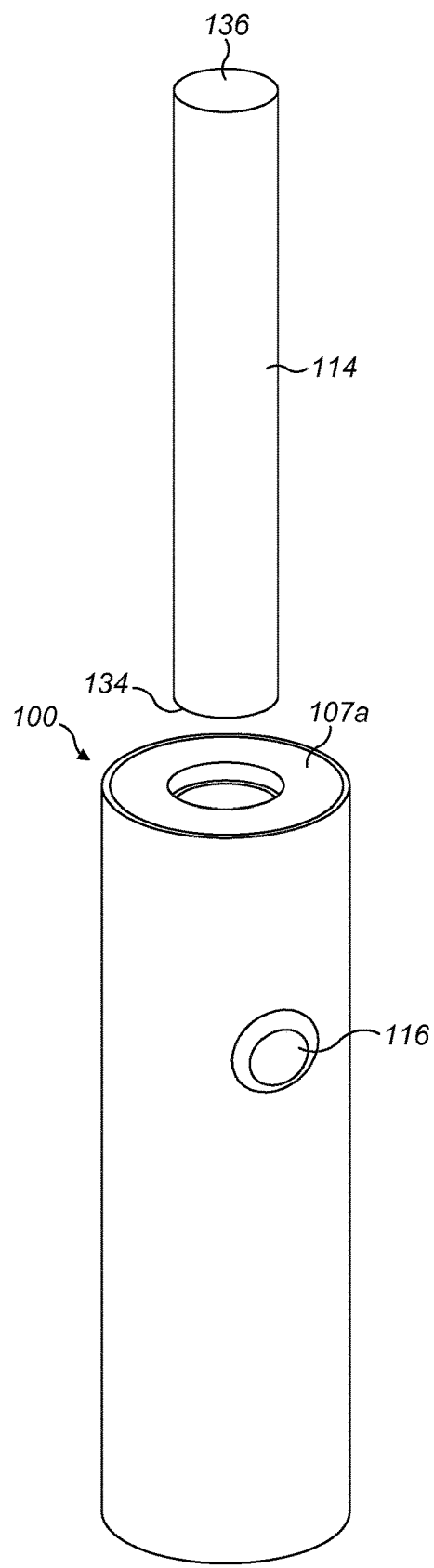
FIG. 3 is a schematic perspective view of the aerosol generation device of FIG. 1, shown with a substrate carrier of aerosol substrate being loaded into the aerosol generation device.
Figure 5:
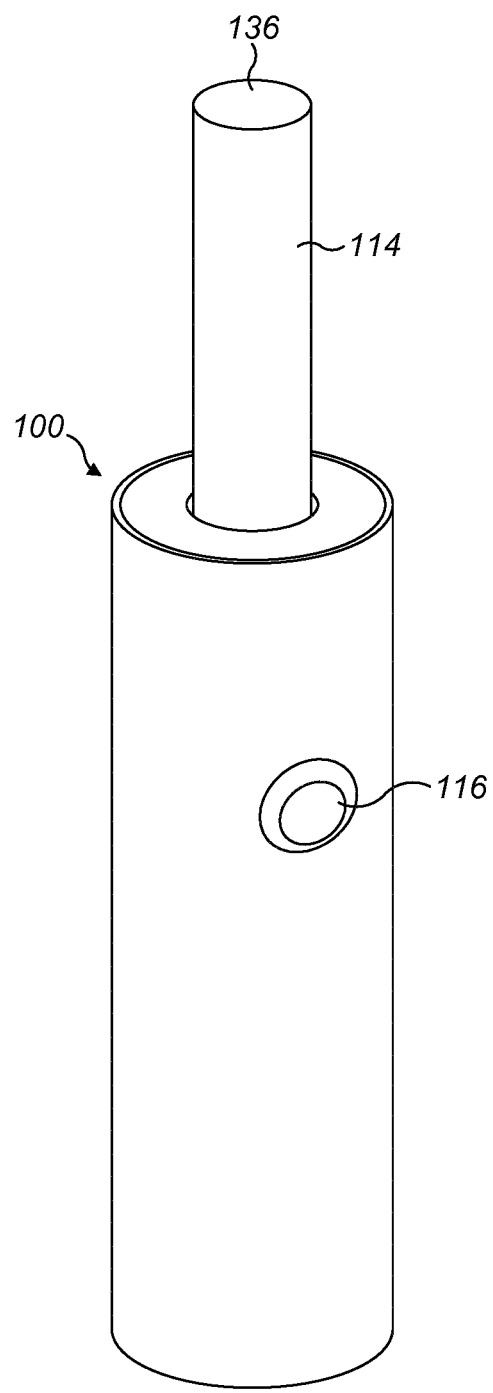
FIG. 5 is a schematic perspective view of the aerosol generation device of FIG. 1, shown with the substrate carrier of aerosol substrate loaded into the aerosol generation device.

As shown, the aerosol generation device 100 holds a pair of washers 107a, 107b in place at the second end 106, by interference fit with an inner portion of the outer casing 102 (in FIGS. 1, 3 and 5 only the upper one, 107a is visible). In some embodiments, the outer casing 102 is crimped or bent around an upper one of the washers 107a at the second end 106 of the aerosol generation device 100 to hold the washers 107a, 107b in place. The other one of the washers 107b (that is, the washer furthest from the second end 106 of the aerosol generation device 100) is supported on a shoulder or annular ridge 109 of the outer casing 102, thereby preventing the lower washer 107b from being seated more than a predetermined distance from the second end 106 of the aerosol generation device 100. The washers 107a, 107b are formed from a thermally insulating material. In this embodiment, the thermally insulating material is suitable for use in medical devices, for example being polyether ether ketone (PEEK).

The aerosol generation device 100 has a heating chamber 108 located towards the second end 106 of the aerosol generation device 100. The heating chamber 108 is open towards the second end 106 of the aerosol generation device 100. In other words, the heating chamber 108 has a first open end 110 towards the second end 106 of the aerosol generation device 100. The heating chamber 108 is held spaced apart from an inner surface of the outer casing 102 by fitting through a central aperture of the washers 107a, 107b. This arrangement holds the heating chamber 108 in a broadly coaxial arrangement with the outer casing 102. The heating chamber 108 is suspended by a flange 138 of the heating chamber 108, located at the open end 110 of the heating chamber 108, being gripped between the pair of washers 107a, 107b. This means that the conduction of heat from the heating chamber 108 to the outer casing 102 generally passes through the washers 107a, 107b, and is thereby limited by the thermally insulating properties of the washers 107a, 107b. Since there is an air gap otherwise surrounding the heating chamber 108, transfer of heat from the heating chamber 108 to the outer casing 102 other than via the washers 107a, 107b is also reduced. In the illustrated embodiment, the flange 138 extends outwardly away from a side wall 126 of the heating chamber 108 by a distance of approximately 1 mm, forming an annular structure.

In order to increase the thermal isolation of the heating chamber 108 further, the heating chamber 108 is also surrounded by insulation. In some embodiments, the insulation is fibrous or foam material, such as cotton wool. In the illustrated embodiment, the insulation comprises an insulating member 152 in the form of an insulating cup comprising a double walled tube 154 and a base 156. In some embodiments, the insulating member 152 may comprise a pair of nested cups enclosing a cavity therebetween. The cavity 158 defined between the walls of the double walled tube 154 can be filled with a thermally insulating material, for example fibres, foams, gels or gases (e.g. at low pressure). In some cases the cavity 158 may comprise a vacuum. Advantageously, a vacuum requires very little thickness to achieve high thermal insulation and the walls of the doubled walled tube 154 enclosing the cavity 158 can be as little as 100 μm thick, and a total thickness (two walls and the cavity 158 between them) can be as low as 1 mm. The base 156 is an insulating material, such as silicone. Since silicone is pliable, electrical connections 150 for a heater 124 can be passed through the base 156, which forms a seal around the electrical connections 150.

As shown in FIGS. 1 to 6 the aerosol generating device 100 may comprise an outer casing 102, a heating chamber 108, and an insulating member 152 as detailed above. FIGS. 1 to 6 show a resiliently deformable member 160 located between the outwardly facing surface of the insulating side wall 154 and the inner surface of the outer casing 102 to hold the insulating member 152 in place. The resiliently deformable member 160 may provide sufficient friction as to create an interference fit to keep the insulating member 152 in place. The resiliently deformable member 160 may be a gasket or an O-ring, or other closed loop of material which conforms to the outwardly facing surface of the insulating side wall 154 and the inner surface of the outer casing 102. The resiliently deformable member 160 may be formed of thermally insulating material, such as silicone. This may provide further insulation between the insulating member 152 and the outer casing 102. This may therefore reduce the heat transferred to the outer casing 102, so that in use the user can hold the outer casing 102 comfortably. The resiliently deformable material is capable of being compressed and deformed, but springs back to its former shape, for example elastic or rubber materials.

As an alternative to this arrangement, the insulating member 152 may be supported by struts running between the insulating member 152 and the outer casing 102. The struts may ensure increased rigidity so that the heating chamber 108 is located centrally within the outer casing 102, or so that it is located in a set location. This may be designed so that heat is distributed evenly throughout the outer casing 102, so that hot spots do not develop.

As yet a further alternative, the heating chamber 108 may be secured in the aerosol generation device 100 by engagement portions on the outer casing 102 for engaging a side wall 126 at an open end 110 of the heating chamber 108. As the open end 110 is exposed to the largest flow of cold air, and therefore cools the quickest, attaching the heating chamber 108 to the outer casing 102 near the open end 110 may allow for the heat to dissipate to the environment quickly, and to ensure a secure fit.

Note that in some embodiments the heating chamber 108 is removable from the aerosol generation device 100. The heating chamber 108 may therefore be easily cleaned, or replaced. In such embodiments the heater 124 and electrical connections 150 may not be removable, and may be left in situ within the insulation member 152.

In the first embodiment, the base 112 of the heating chamber 108 is closed. That is, the heating chamber 108 is cup-shaped. In other embodiments, the base 112 of the heating chamber 108 has one or more holes, or is perforated, with the heating chamber 108 remaining generally cup-shaped but not being closed at the base 112. In yet other embodiments, the base 112 is closed, but the side wall 126 has one or more holes, or is perforated, in a region adjacent the base 112, e.g. between the heater 124 (or metallic layer 144) and the base 112. The heating chamber 108 also has the side wall 126 between the base 112 and the open end 110. The side wall 126 and the base 112 are connected to one another. In the first embodiment, the side wall 126 is tubular. More specifically, it is cylindrical. However, in other embodiments the side wall 126 has other suitable shapes, such as a tube with an elliptical or polygonal cross section. Usually, the cross section is generally uniform over the length of the heating chamber 108 (not taking account of the protrusions 140), but in other embodiments it may change, e.g. the cross-section may reduce in size towards one end so that the tubular shape tapers or is frustoconical.

In the illustrated embodiment, the heating chamber 108 is unitary, which is to say the side wall 126 and base 112 are formed from a single piece of material, for example by a deep drawing process. This can result in a stronger overall heating chamber 108. Other examples may have the base 112 and/or flange 138 formed as a separate piece and then attached to the side wall 126. This may in turn allow the flange 138 and/or base 112 to be formed from a different material to that from which the side wall 126 is made. The side wall itself 126 is arranged to be thin-walled. In some embodiments, the side wall is up to 150 μm thick. Typically, the side wall 126 is less than 100 μm thick, for example around 90 μm thick, or even around 80 μm thick. In some cases it may be possible for the side wall 126 to be around 50 μm thick, although as the thickness decreases, the failure rate in the manufacturing process increases. Overall, a range of 50 µm to 100 µm is usually appropriate, with a range of 70 µm to 90 µm being optimal. The manufacturing tolerances are up to around ±10 µm, but the parameters provided are intended to be accurate to around ±5 µm.

When the side wall 126 is as thin as defined above, the thermal characteristics of the heating chamber 108 change markedly. The transmission of heat through the side wall 126 sees negligible resistance because the side wall 126 is so thin, yet thermal transmission along the side wall 126 (that is, parallel to a central axis or around a circumference of the side wall 126) has a small channel along which conduction can occur, and so heat produced by the heater 124, which is located on the external surface of the heating chamber 108, remains localised close to the heater 124 in a radially outward direction from the side wall 126 at the open end, but quickly results in heating of the inner surface of the heating chamber 108. In addition, a thin side wall 126 helps to reduce the thermal mass of the heating chamber 108, which in turn improves the overall efficiency of the aerosol generation device 100, since less energy is used in heating the side wall 126.

The heating chamber 108, and specifically the side wall 126 of the heating chamber 108, comprises a material having a thermal conductivity of 50 W/mK or less. In the first embodiment, the heating chamber 108 is metal, preferably stainless steel. Stainless steel has a thermal conductivity of between around 15 W/mK to 40 W/mK, with the exact value depending on the specific alloy. As a further example, the 300 series of stainless steel, which is appropriate for this use, has a thermal conductivity of around 16 W/mK. Suitable examples include 304, 316 and 321 stainless steel, which has been approved for medical use, is strong and has a low enough thermal conductivity to allow the localisation of heat described herein.

Materials with thermal conductivity of the levels described reduce the ability of heat to be conducted away from a region where heat is applied in comparison to materials with higher thermal conductivity. For example, heat remains localised adjacent to the heater 124. As heat is inhibited from moving to other parts of the aerosol generation device 100, heating efficiency is thereby improved by ensuring that only those parts of the aerosol generation device 100 which are intended to be heated are indeed heated and those which are not intended to be heated, are not.

Metals are suitable materials, since they are strong, malleable and easy to shape and form. In addition their thermal properties vary widely from metal to metal, and can be tuned by careful alloying, if required. In this application, "metal" refers to elemental (i.e. pure) metals as well as alloys of several metals or other elements, e.g. carbon.

Accordingly, the configuration of the heating chamber 108 with thin side walls 126, together with the selection of materials with desirable thermal properties from which the side walls 126 are formed, ensures that heat can be efficiently conducted through the side walls 126 and into the aerosol substrate 128. Advantageously, this also results in the time taken to raise the temperature from ambient to a temperature at which an aerosol may be released from the aerosol substrate 128 being reduced following initial actuation of the heater.

The heating chamber 108 is formed by deep drawing. This is an effective method for forming the heating chamber 108 and can be used to provide the very thin side wall 126. The deep drawing process involves pressing a sheet metal blank with a punch tool to force it into a shaped die. By using a series of progressively smaller punch tools and dies, a tubular structure is formed which has a base at one end and with a tube which is deeper than the distance across the tube (it is the tube being relatively longer than it is wide which leads to the term "deep drawing"). Due to being formed in this manner, the side wall of a tube formed in this way is the same thickness as the original sheet metal. Similarly, the base formed in this way is the same thickness as the initial sheet metal blank. A flange can be formed at the end of the tube by leaving a rim of the original sheet metal blank extending outwardly at the opposite end of the tubular wall to the base (i.e. starting with more material in the blank than is needed to form the tube and base). Alternatively a flange can be formed afterwards in a separate step involving one or more of cutting, bending, rolling, swaging, etc.

As described, the tubular side wall 126 of the first embodiment is thinner than the base 112. This can be achieved by first deep drawing a tubular side wall 126, and subsequently ironing the wall. Ironing refers to heating the tubular side wall 126 and drawing it, so that it thins in the process. In this way, the tubular side wall 126 can be made to the dimensions described herein.

The thin side wall 126 can be fragile. This can be mitigated by providing additional structural support to the side wall 126, and by forming the side wall 126 in a tubular, and preferably cylindrical, shape. In some cases additional structural support is provided as a separate feature, but it should be noted that the flange 138 and the base 112 also provide a degree of structural support. Considering the base 112 first, note that a tube that is open at both ends is generally susceptible to crushing, while providing the heating chamber 108 of the disclosure with the base 112 adds support. Note that in the illustrated embodiment the base 112 is thicker than the side wall 126, for example 2 to 10 times as thick as the side wall 126. In some cases this may result in a base 112 which is between 200 µm and 500 µm thick, for example approximately 400 µm thick. The base 112 also has a further purpose of preventing a substrate carrier 114 from being inserted too far into the aerosol generation device 100. The increased thickness of the base 112 helps to prevent damage being caused to the heating chamber 108 in the event of a user inadvertently using too much force when inserting a substrate carrier 114. Similarly, when the user cleans the heating chamber 108, the user might typically insert an object, such as an elongate brush, through the open end 110 of the heating chamber 108. This means that the user is likely to exert a stronger force against the base 112 of the heating chamber 108, as the elongate object comes to abut the base 112, than against the side wall 126. The thickness of the base 112 relative to the side wall 126 can therefore help to prevent damage to the heating chamber 108 during cleaning. In other embodiments, the base 112 has the same thickness as the side wall 126, which provides some of the advantageous effects set out above.

The flange 138 extends outwardly from the side wall 126 and has an annular shape extending all around a rim of the side wall 126 at the open end 110 of the heating chamber 108. The flange 138 resists bending and shear forces on the side wall 126. For example, lateral deformation of the tube defined by the side wall 126 is likely to require the flange 138 to buckle. Note that while the flange 138 is shown extending broadly perpendicularly from the side wall 126, the flange 138 can extend obliquely from the side wall 126, for example making a funnel shape with the side wall 126, while still retaining the advantageous features described above. In some embodiments, the flange 138 is located only part of the way around the rim of the side wall 126, rather than being annular. In the illustrated embodiment, the flange 138 is the same thickness as the side wall 126, but in other embodiments the flange 138 is thicker than the side wall 126 in order to improve the resistance to deformation. Any increased thickness of a particular part for strength is weighed against the increased thermal mass introduced, in order that the aerosol generation device 100 as a whole remains robust but efficient.

A plurality of protrusions 140 are formed in the inner surface of the side wall 126. The width of the protrusions 140, around the perimeter of the side wall 126, is small relative to their length, parallel to the central axis of the side wall 126 (or broadly in a direction from the base 112 to the open end 110 of the heating chamber 108). In this example there are four protrusions 140. Four is usually a suitable number of protrusions 140 for holding a substrate carrier 114 in a central position within the heating chamber 108, as will become apparent from the following discussion. In some embodiments, three protrusions may be sufficient, e.g. (evenly) spaced at intervals of about 120 degrees around the circumference of the side wall 126. The protrusions 140 have a variety of purposes and the exact form of the protrusions 140 (and corresponding indentations on an outer surface of the side wall 126) is chosen based on the desired effect. In any case, the protrusions 140 extend towards and engage the substrate carrier 114, and so are sometimes referred to as engagement elements. Indeed, the terms "protrusion" and "engagement element" are used interchangeably herein. Similarly, where the protrusions 140 are provided by pressing the side wall 126 from the outside, for example by hydroforming or pressing, etc., the term "indentation" is also used interchangeably with the terms "protrusion" and "engagement element". Forming the protrusions 140 by indenting the side wall 126 has the advantage that they are unitary with the side wall 126 so have a minimal effect on heat flow. In addition, the protrusions 140 do not add any thermal mass, as would be the case if an extra element were to be added to the inner surface of the side wall 126 of the heating chamber 108. Indeed, as a result of forming the protrusions 140 by indenting the side wall 126, the thickness of the side wall 126 remains substantially constant in the circumferential and/or the axial direction, even where the protrusions are provided. Lastly, indenting the side wall as described increases the strength of the side wall 126 by introducing portions extending transverse to the side wall 126, so providing resistance to bending of the side wall 126.

The heating chamber 108 is arranged to receive substrate carrier 114. Typically, the substrate carrier comprises an aerosol substrate 128 such as tobacco or another suitable aerosolisable material that is heatable to generate an aerosol for inhalation. In the first embodiment, the heating chamber 108 is dimensioned to receive a single serving of aerosol substrate 128 in the form of a substrate carrier 114, also known as a "consumable", as shown in FIGS. 3 to 6, for example. However, this is not essential, and in other embodiments the heating chamber 108 is arranged to receive the aerosol substrate 128 in other forms, such as loose tobacco or tobacco packaged in other ways.

The aerosol generation device 100 works by both conducting heat from the surface of the protrusions 140 that engage against the outer layer 132 of substrate carrier 114 and by heating air in an air gap between the inner surface of the side wall 126 and the outer surface of a substrate carrier 114. That is there is convective heating of the aerosol substrate 128 as heated air is drawn through the aerosol substrate 128 when a user sucks on the aerosol generation device 100 (as described in more detail below). The width and height (i.e. the distance that each protrusion 140 extends into the heating chamber 128) increases the surface area of the side wall 126 that conveys heat to the air, so allowing the aerosol generation device 100 to reach an effective temperature quicker.

The protrusions 140 on the inner surface of the side wall 126 extend towards and indeed contact the substrate carrier 114 when it is inserted into the heating chamber 108 (see FIG. 6, for example). This results in the aerosol substrate 128 being heated by conduction as well, through an outer layer 132 of the substrate carrier 114.

It will be apparent that to conduct heat into the aerosol substrate 128, the surface 145 of the protrusion 140 must reciprocally engage with the outer layer 132 of substrate carrier 114. However, manufacturing tolerances may result in small variations in the diameter of the substrate carrier 114. In addition, due to the relatively soft and compressible nature outer layer 132 of the substrate carrier 114 and aerosol substrate 128 held therein, any damage to, or rough handling of, the substrate carrier 114 may result in the diameter being reduced or a change of shape to an oval or elliptical cross-section in the region which the outer layer 132 is intended to reciprocally engage with the surfaces 145 of protrusions 140. Accordingly, any variation in diameter of the substrate carrier 114 may result in reduced thermal contact between the outer layer 132 of substrate carrier 114 and the surface 145 of the protrusion 140 which detrimentally effects the conduction of heat from the surface 145 of protrusion 140 through the outer layer 132 of substrate carrier 114 and into the aerosol substrate 128. To mitigate the effects of any variation in the diameter of the substrate carrier 114 due to manufacturing tolerances or damage, the protrusions 140 are preferably dimensioned to extend far enough into the heating chamber 108 to cause compression of the substrate carrier 114 and thereby ensure an interference fit between surfaces 145 of the protrusions 140 and the outer layer 132 of the substrate carrier 114. This compression of the outer layer 132 of the substrate carrier 114 may also cause longitudinal marking of the outer layer 132 of substrate carrier 114 and provide a visual indication that the substrate carrier 114 has been used.

FIG. 6(*a*) shows an enlarged view of the heating chamber 108 and substrate carrier 114. As can be seen, arrows B illustrate the air flow paths which provide the convective heating described above. As noted above, the heating chamber 108 may be a cup-shaped, having a sealed, air tight base 112, meaning that air must flow down the side of the substrate carrier 114 in order to enter the first end 134 of the substrate carrier because air flow through the sealed, air tight base 112 is not possible. As noted above, the protrusions 140 extend a sufficient distance into the heating chamber 108 to at least contact the outer surface of the substrate carrier 114, and typically to cause at least some degree of compression of the substrate carrier. Consequently, since the sectional view of FIG. 6(*a*) cuts through protrusions 140 at the left and right of the Figure, there is no air gap all the way along the heating chamber 108 in the plane of the Figure. Instead the air flow paths (arrows B) are shown as dashed lines in the region of the protrusions 140, indicating that the air flow path is located in front of and behind the protrusions 140. In fact, a comparison with FIG. 2(*a*) shows that the air flow paths occupy the four equally spaced gap regions between the four protrusions 140. Of course in some situations there will be more or fewer than four protrusions 140, in which case the general point that the air flow paths exist in the gaps between the protrusions remains true.

Also emphasised in FIG. 6(a) is the deformation in the outer surface of the substrate carrier 114 caused by its being forced past the protrusions 140 as the substrate carrier 114 is being inserted into the heating chamber 108. As noted above, the distance which the protrusions 140 extend into the heating chamber can advantageously be selected to be far enough to cause compression of any substrate carrier 114. This (sometimes permanent) deformation during heating can help to provide stability to the substrate carrier 114 in the sense that the deformation of the outer layer 132 of the substrate carrier 114 creates a denser region of the aerosol substrate 128 near the first end 134 of the substrate carrier 114. In addition, the resulting contoured outer surface of the substrate carrier 114 provides a gripping effect on the edges of the denser region of the aerosol substrate 128 near the first end 134 of the substrate carrier 114. Overall, this reduces the likelihood that any loose aerosol substrate will fall from the first end 134 of the substrate carrier 114, which would result in dirtying of the heating chamber 108. This is a useful effect because, as described above, heating the aerosol substrate 128 can cause it to shrink, thereby increasing the likelihood of loose aerosol substrate 128 falling from the first end 134 of the substrate carrier 114. This undesirable effect is mitigated by the deformation effect described.

In order to be confident that the protrusions 140 contact the substrate carrier 114 (contact being necessary to cause conductive heating, compression and deformation of the aerosol substrate) account is taken of the manufacturing tolerances of each of: the protrusions 140; the heating chamber 108; and the substrate carrier 114. For example, the internal diameter of the heating chamber 108 may be 7.6±0.1 mm, the substrate 114 carrier may have an external diameter of 7.0±0.1 mm and the protrusions 140 may have a manufacturing tolerance of ±0.1 mm. In this example, assuming that the substrate carrier 114 is mounted centrally in the heating chamber 108 (i.e. leaving a uniform gap around the outside of the substrate carrier 114), then gap which each protrusion 140 must span to contact the substrate carrier 114 ranges from 0.2 mm to 0.4 mm. In other words, since each protrusion 140 spans a radial distance, the lowest possible value for this example is half the difference between the smallest possible heating chamber 108 diameter and the largest possible substrate carrier 114 diameter, or [(7.6−0.1)−(7.0+0.1)]/2=0.2 mm. The upper end of the range for this example is (for similar reasons) half the difference between the largest possible heating chamber 108 diameter and the smallest possible substrate carrier 114 diameter, or [(7.6+0.1)−(7.0−0.1)]/2=0.4 mm. In order to ensure that the protrusions 140 definitely contact the substrate carrier, it is apparent that they must each extend at least 0.4 mm into the heating chamber in this example. However, this does not account for the manufacturing tolerance of the protrusions 140. When a protrusion of 0.4 mm is desired, the range which is actually produced is 0.4±0.1 mm or varies between 0.3 mm and 0.5 mm. Some of these will not span the maximum possible gap between the heating chamber 108 and the substrate carrier 114. Therefore, the protrusions 140 of this example should be produced with a nominal protruding distance of 0.5 mm, resulting in a range of values between 0.4 mm and 0.6 mm. This is sufficient to ensure that the protrusions 140 will always contact the substrate carrier.

In general, writing the internal diameter of the heating chamber 108 as $D\pm\delta_D$, the external diameter of the substrate carrier 114 as $d\pm\delta_d$, and the distance which the protrusions 140 extend into the heating chamber 108 as $L\pm\delta_L$, then the distance which the protrusions 140 are intended to extend into the heating chamber should be selected as:

$$L = \frac{(D + |\delta_D|) - (d - |\delta_d|)}{2} + |\delta_L|$$

where $|\delta_D|$ refers to the magnitude of the manufacturing tolerance of the internal diameter of the heating chamber 108, $|\delta_d|$, refers to the magnitude of the manufacturing tolerance of the external diameter of the substrate carrier 114 and $|\delta_L|$ refers to the magnitude of the manufacturing tolerance of the distance which the protrusions 140 extend into the heating chamber 108. For the avoidance of doubt, where the internal diameter of the heating chamber 108 is $D\pm\delta_D$=7.6±0.1 mm, then $|\delta_D|$=0.1 mm.

Furthermore, manufacturing tolerances may result in minor variations in the density of the aerosol substrate 128 within the substrate carrier 114. Such variances in the density of the aerosol substrate 128 may exist both axially and radially within a single substrate carrier 114, or between different substrate carrier 114 manufactured in the same batch. Accordingly, it will also be apparent that to ensure relatively uniform conduction of heat within the aerosol substrate 128 within a particular substrate carrier 114 it is important to that the density of the aerosol substrate 128 is also relatively consistent. To mitigate the effects of any inconsistencies in the density of the aerosol substrate 128 the protrusions 140 may be dimensioned to extend far enough into the heating chamber 108 to cause compression of the aerosol substrate 128 within the substrate carrier 114, which can improve thermal conduction through the aerosol substrate 128 by eliminating air gaps. In the illustrated embodiment, protrusions 140 extending about 0.4 mm into the heating chamber 108 are appropriate. In other examples, the distance which the protrusions 140 extend into the heating chamber 108 may be defined as a percentage of the distance across the heating chamber 108. For example, the protrusions 140 may extend a distance between 3% and 7%, for example about 5% of the distance across the heating chamber 108. In another embodiment, the restricted diameter circumscribed by the protrusions 140 in the heating chamber 108 is between 6.0 mm and 6.8 mm, more preferably between 6.2 mm and 6.5 mm, and in particular 6.2 mm (±0.5 mm). Each of the plurality of protrusions 140 spans a radial distance between 0.2 mm and 0.8 mm, and most preferably between 0.2 mm and 0.4 mm.

In relation to the protrusions/indents 140, the width corresponds to the distance around the perimeter of the side wall 126. Similarly, their length direction runs transverse to this, running broadly from the base 112 to the open end of the heating chamber 108, or to the flange 138, and their height corresponds to the distance that the protrusions extend from the sidewall 126. It will be noted that the space between adjacent protrusions 140, the side wall 126, and the outer layer 132 substrate carrier 114 defines the area available for air flow. This has the effect that the smaller the distance between adjacent protrusions 140 and/or the height of the protrusions 140 (i.e. the distance which the protrusions 140 extend into the heating chamber 108), the harder that a user has to suck to draw air through the aerosol generation device 100 (known as increased draw resistance). It will be apparent that (assuming the protrusions 140 are touching the outer layer 132 of the substrate carrier 114) that it is the width of the protrusions 140 which defines the reduction in air flow channel between the side wall 126 and the substrate carrier 114. Conversely (again under the assumption that the protrusions 140 are touching the outer layer 132 of the substrate carrier 114), increasing the height of the protrusions 140 results in more compression of the aerosol substrate, which eliminates air gaps in the aerosol substrate 128 and also increases draw resistance. These two parameters can be adjusted to give a satisfying draw resistance, which is neither too low nor too high. The heating chamber 108 can also be made larger to increase the air flow channel between the side wall 126 and the substrate carrier 114, but there is a practical limit on this before the heater 124 starts to become ineffective as the gap is too large. Typically a gap of 0.2 mm to 0.4 mm or from 0.2 mm to 0.3 mm around the outer surface of the substrate carrier 114 is a good compromise, which allows fine tuning of the draw resistance within acceptable values by altering the dimensions of the protrusions 140. The air gap around the outside of the substrate carrier 114 can also be altered by changing the number of protrusions 140. Any number of protrusions 140 (from one upwards) provides at least some of the advantages set out herein (increasing heating area, providing compression, providing conductive heating of the aerosol substrate 128, adjusting the air gap, etc.). Four is the lowest number that reliably holds the substrate carrier 114 in a central (i.e. coaxial) alignment with the heating chamber 108. In another possible design, only three protrusions are present which are distributed at 1200 distance from one another. Designs with fewer than four protrusions 140 tend to allow a situation where the substrate carrier 114 is pressed against a portion of the side wall 126 between two of the protrusions 140. Clearly with limited space, providing very large numbers of protrusions (e.g. thirty or more) tends towards a situation in which there is little or no gap between them, which can completely close the air flow path between the outer surface of the substrate carrier 114 and the inner surface of the side wall 126, greatly reducing the ability of the aerosol generating device to provide convective heating. In conjunction with the possibility of providing a hole in the centre of the base 112 for defining an air flow channel, such designs can still be used, however. Usually the protrusions 140 are evenly spaced around the perimeter of the side wall 126, which can help to provide even compression and heating, although some variants may have an asymmetric placement, depending on the exact effect desired.

It will be apparent that the size and number of the protrusions 140 also allows the balance between conductive and convective heating to be adjusted. By increasing the width of a protrusion 140 which contacts the substrate carrier 114 (distance which a protrusion 140 extends around the perimeter of the side wall 126), the available perimeter of the side 126 to act as an air flow channel (arrows B in FIGS. 6 and 6(a)) is reduced, so reducing the convective heating provided by the aerosol generation device 100. However, since a wider protrusion 140 contacts the substrate carrier 114 over a greater portion of the perimeter, so increasing the conductive heating provided by the aerosol generation device 100. A similar effect is seen if more protrusions 140 are added, in that the available perimeter of the side wall 126 for convection is reduced while increasing the conductive channel by increasing the total contact surface area between the protrusion 140 and the substrate carrier 114. Note that increasing the length of a protrusion 140 also decreases the volume of air in the heating chamber 108 which is heated by the heater 124 and reduces the convective heating, while increasing the contact surface area between the protrusion 140 and the substrate carrier and increasing the conductive heating. Increasing the distance which each protrusion 140 extends into the heating chamber 108 can help to improve the conduction heating without significantly reducing convective heating. Therefore, the aerosol generation device 100 can be designed to balance the conductive and convective heating types by altering the number and size of protrusions 140, as described above. The heat localisation effect due to the relatively thin side wall 126 and the use of a relatively low thermal conductivity material (e.g. stainless steel) ensures that conductive heating is an appropriate means of transferring heat to the substrate carrier 114 and subsequently to the aerosol substrate 128 because the portions of the side wall 126 which are heated can correspond broadly to the locations of the protrusions 140, meaning that the heat generated is conducted to the substrate carrier 114 by the protrusions 140, but is not conducted away from here. In locations which are heated but do not correspond to the protrusions 140, the heating of the side 126 leads to the convective heating described above.

As shown in FIGS. 1 to 6, the protrusions 140 are elongate, which is to say they extend for a greater length than their width. In some cases the protrusions 140 may have a length which is five, ten or even twenty-five times their width. For example, as noted above, the protrusions 140 may extend 0.4 mm into the heating chamber 108, and may further be 0.5 mm wide and 12 mm long in one example. These dimensions are suitable for a heating chamber 108 of length between 30 mm and 40 mm. In this example, the protrusions 140 do not extend for the full length of the heating chamber 108, since in the example given they are shorter than the heating chamber 108. The protrusions 140 therefore each have a top edge 142a and a bottom edge 142b. The top edge 142a is the part of the protrusion 140 located closest to the open end 110 of the heating chamber 108, and also closest to the flange 138. The bottom edge 142b is the end of the protrusion 140 located closest to the base 112. Above the top edge 142a (closer to the open end than the top edge 142a) and below the bottom edge 142b (closer to the base 112 than the bottom edge 142b) it can be seen that the side wall 126 has no protrusions 140, that is, the side wall 126 is not deformed or indented in these portions. In some examples, the protrusions 140 are longer and do extend all the way to the top and/or bottom of the side wall 126, such that one or both of the following is true: the top edge 142a aligns with the open end 110 of the heating chamber 108 (or the flange 138); and the bottom edge 142b aligns with the base 112. Indeed in such cases, there may not even be a top edge 142a and/or bottom edge 142b.

It can be advantageous for the protrusions 140 not to extend all the way along the length of the heating chamber 108 (e.g. from base 112 to flange 138). At the upper end, as will be described below, the top edge 142a of the protrusion 140 can be used as an indicator for a user to ensure that they do not insert the substrate carrier 114 too far into the aerosol generation device 100. However, it can be useful not only to heat regions of the substrate carrier 114 which contain aerosol substrate 128, but also other regions. This is because once aerosol is generated, it is beneficial to keep its temperature high (higher than room temperature, but not so high as to burn a user) to prevent re-condensation, which would in turn detract from the user's experience. Therefore, the effective heating region of the heating chamber 108 extends past (i.e. higher up the heating chamber 108, closer to the open end) the expected location of the aerosol substrate 128. This means that the heating chamber 108 extends higher up than the upper edge 142a of the protrusion 140, or equivalently that the protrusion 140 does not extend all the way up to the open end of the heating chamber 108. Similarly, compression of the aerosol substrate 128 at an end 134 of the substrate carrier 114 that is inserted into the heating chamber 108 can lead to some of the aerosol substrate 128 falling out of the substrate carrier 114 and dirtying the heating chamber 108. It can therefore be advantageous to have the lower edge 142b of the protrusions 140 located further from the base 112 than the expected position of the end 134 of the substrate carrier 114.

In some embodiments, the protrusions 140 are not elongate, and have approximately the same width as their length. For example they may be as wide as they are high (e.g. having a square or circular profile when looked at in a radial direction), or they may be two to five times as long as they are wide. Note that the centring effect that the protrusions 140 provide can be achieved even when the protrusions 140 are not elongate. In some examples, there may be multiple sets of protrusions 140, for example an upper set close to the open end of the heating chamber 108 and a lower set spaced apart from the upper set, located close to the base 112. This can help to ensure that the substrate carrier 114 is held in a coaxial arrangement while reducing the draw resistance introduced by a single set of protrusions 140 over the same distance. The two sets of protrusions 140 may be substantially the same, or they may vary in their length or width or in the number or placement of protrusions 140 arranged around the side wall 126.

In side view, the protrusions 140 are shown as having a trapezoidal profile. What is meant here is that the profile along the length of each protrusion 140, e.g. the median lengthwise cross-section of the protrusion 140, is roughly trapezoidal. That is to say that the upper edge 142a is broadly planar and tapers to merge with the side wall 126 close to the open end 110 of the heating chamber 108. In other words, the upper edge 142a is a bevelled shape in profile. Similarly, the protrusion 140 has a lower portion 142b that is broadly planar and tapers to merge with the side wall 126 close to the base 112 of the heating chamber 108. That is to say, the lower edge 142b is a bevelled shape in profile. In other embodiments, the upper and/or lower edges 142a, 142b do not taper towards the side wall 126 but instead extend at an angle of approximately 90 degrees from the side wall 126. In yet other embodiments, the upper and/or lower edges 142a, 142b have a curved or rounded shape. Bridging the upper and lower edges 142a, 142b is a broadly planar region which contacts and/or compresses the substrate carrier 114. A planar contacting portion can help to provide even compression and conductive heating. In other examples, the planar portion may instead be a curved portion which bows outwards to contact the substrate carrier 128, for example having a polygonal or curved profile (e.g. a section of a circle).

In cases where the protrusions 140 have an upper edge 142a, the protrusions 140 also act to prevent over-insertion of a substrate carrier 114. As shown most clearly in FIGS. 4 and 6, the substrate carrier 114 has a lower part containing the aerosol substrate 128, which ends part way along the substrate carrier 114 at a boundary of the aerosol substrate 128. The aerosol substrate 128 is typically more compressible than other regions 130 of the substrate carrier 114. Therefore, a user inserting the substrate carrier 114 feels an increase in resistance when the upper edge 142a of the protrusions 140 is aligned with the boundary of the aerosol substrate 128, due to the reduced compressibility of other regions 130 of the substrate carrier 114. In order to achieve this, the part(s) of the base 112 which the substrate carrier 114 contacts should be spaced away from the top edge 142a of the protrusion 140 by the same distance as the length of the substrate carrier 114 occupied by the aerosol substrate 128. In some examples, the aerosol substrate 128 occupies around 20 mm of the substrate carrier 114, so the spacing between the top edge 142a of the protrusion 140 and the parts of the base which the substrate carrier 114 touches when it is inserted into the heating chamber 108 is also about 20 mm.

As shown, the base 112 also includes a platform 148. The platform 148 is formed by a single step in which the base 112 is pressed from below (e.g. by hydroforming, mechanical pressure, as part of the formation of the heating chamber 108) to leave an indentation on an outside surface (lower face) of the base 112 and the platform 148 on the inside surface (upper face, inside the heating chamber 108) of the base 112. Where the platform 148 is formed in this way, e.g. with a corresponding indent, these terms are used interchangeably. In other cases, the platform 148 may be formed from a separate piece which is attached to the base 112 separately, or by milling out parts of the base 112 to leave the platform 148; in either case there need not be a corresponding indent. These latter cases may provide more variety in the shape of platform 148 that can be achieved, since they do not rely on a deformation of the base 112, which (while a convenient manner), limits the complexity with which a shape can be chosen. While the shape shown is broadly circular, there are, of course, a wide variety of shapes which will achieve the desired effects set out in detail herein, including, but not limited to: polygonal shapes, curved shapes, including multiple shapes of one or more of these types. Indeed, while shown as a centrally located platform 148, there could in some cases be one or more platform elements spaced away from the centre, for example at the edges of the heating chamber 108. Typically the platform 148 has a broadly flat top, but hemispherical platforms or those with a rounded dome shape at the top are also envisaged.

As noted above, the distance between the top edge 142a of the protrusion 140 and the parts of the base 112 which the substrate carrier 114 touches can be carefully selected to match the length of the aerosol substrate 128 to provide a user with an indication that they have inserted the substrate carrier 114 as far into the aerosol generation device 100 as they should. In cases where there is no platform 148 on the base 112, then this simply means that the distance from the base 112 to the top edge 142a of the protrusion 140 should match the length of the aerosol substrate 128. Where the platform 148 is present, then the length of the aerosol substrate 128 should correspond to the distance between the top edge 142a of the protrusion 140 and the uppermost portion of the platform 148 (i.e. that portion closest to the open end 110 of the heating chamber 108 in some examples). In yet another example, the distance between the top edge 142a of the protrusion 140 and the uppermost portion of the platform 148 is slightly shorter than the length of the aerosol substrate 128. This means that the tip 134 of the substrate carrier 114 must extend slightly past the uppermost part of the platform 148, thereby causing compression of the aerosol substrate 128 at the end 134 of the substrate carrier 114. Indeed, this compression effect can occur even in examples where there are no protrusions 140 on the inner surface of the side wall 126. This compression can help to prevent aerosol substrate 128 at the end 134 of the substrate carrier 114 from falling out into the heating chamber 108, thereby reducing the need for cleaning of the heating chamber 108, which can be a complex and difficult task. In addition, the compression helps to compress the end 134 of the substrate carrier 114, thereby mitigating the effect described above where it is inappropriate to compress this region using protrusions 140 extending from the side wall 126, due to their tendency to increase the likelihood that the aerosol substrate 128 falls out of the substrate carrier 114.

The platform 148 also provides a region that can collect any aerosol substrate 128 which does fall out of the substrate carrier 114 without impeding the air flow path into the tip 134 of the substrate carrier 114. For example, the platform 148 divides the lower end of the heating chamber 108 (i.e. the parts closest to the base 112) into raised portions forming the platform 148 and lower portions forming the rest of the base 112. The lower portions can receive loose bits of aerosol substrate 128 which fall out of the substrate carrier 114, while air can still flow over such loose bits of aerosol substrate 128 and into the end of the substrate carrier 114. The platform 148 can be about 1 mm higher than the rest of the base 112 to achieve this effect. The platform 148 may have a diameter smaller than the diameter of the substrate carrier 114 so that it does not prevent air from flowing through the aerosol substrate 128. Preferably, the platform 148 has a diameter of between 0.5 mm and 0.2 mm, most preferably between 0.45 mm and 0.35 mm, such as 0.4 mm (±0.03 mm).

The aerosol generation device 100 has a user operable button 116. In the first embodiment, the user-operable button 116 is located on a side wall 118 of the casing 102. The user-operable button 116 is arranged so that on actuating the user-operable button 116, e.g. by depressing the user-operable button 116, the aerosol generation device 100 is activated to heat the aerosol substrate 128 to generate the aerosol for inhalation. In some embodiments, the user-operable button 116 is also arranged to allow the user to activate other functions of the aerosol generation device 100, and/or to illuminate so as to indicate a status of the aerosol generation device 100. In other examples a separate light or lights (for example one or more LEDs or other suitable light sources) may be provided to indicate the status of the aerosol generation device 100. In this context, status may mean one or more of: battery power remaining, heater status (e.g. on, off, error, etc.), device status (e.g. ready to take a puff, or not), or other indication of status, for example error modes, indications of the number of puffs or entire substrate carriers 114 consumed or remaining until the power supply is depleted, and so on.

In the first embodiment, the aerosol generation device 100 is electrically powered. That is, it is arranged to heat the aerosol substrate 128 using electrical power. For this purpose, the aerosol generation device 100 has an electrical power source 120, e.g. a battery. The electrical power source 120 is coupled to control circuitry 122. The control circuitry 122 is in turn coupled to a heater 124. The user-operable button 116 is arranged to cause coupling and uncoupling of the electrical power source 120 to the heater 124 via the control circuitry 122. In this embodiment, the electrical power source 120 is located towards the first end 104 of the aerosol generation device 100. This allows the electrical power source 120 to be spaced away from the heater 124, which is located towards the second end 106 of the aerosol generation device 100. In other embodiments, the heating chamber 108 is heated in other ways, e.g. by burning a combustible gas.

A heater 124 is attached to the outside surface of the heating chamber 108. The heater 124 is provided on a metallic layer 144, which is itself provided in contact with the outer surface of the side wall 126. The metallic layer 144 forms a band around the heating chamber 108, conforming to the shape of the outer surface of the side wall 126. The heater 124 is shown mounted centrally on the metallic layer 144, with the metallic layer 144 extending an equal distance upwardly and downwardly beyond the heater 124. As shown, the heater 124 is located entirely on the metallic layer 144, such that the metallic layer 144 covers a larger area than the area occupied by the heater 124. The heater 124 as shown in FIGS. 1 to 6 is attached to a middle portion of the heating chamber 108, between the base 112 and the open end 110, and is attached to an area of the outside surface covered in a metallic layer 114. It is noted that in other embodiments the heater 124 may be attached to other portions of the heating chamber 108, or may be contained within the side wall 126 of the heating chamber 108, and it is not essential that the outside of the heating chamber 108 include a metallic layer 144.

Figure 7:
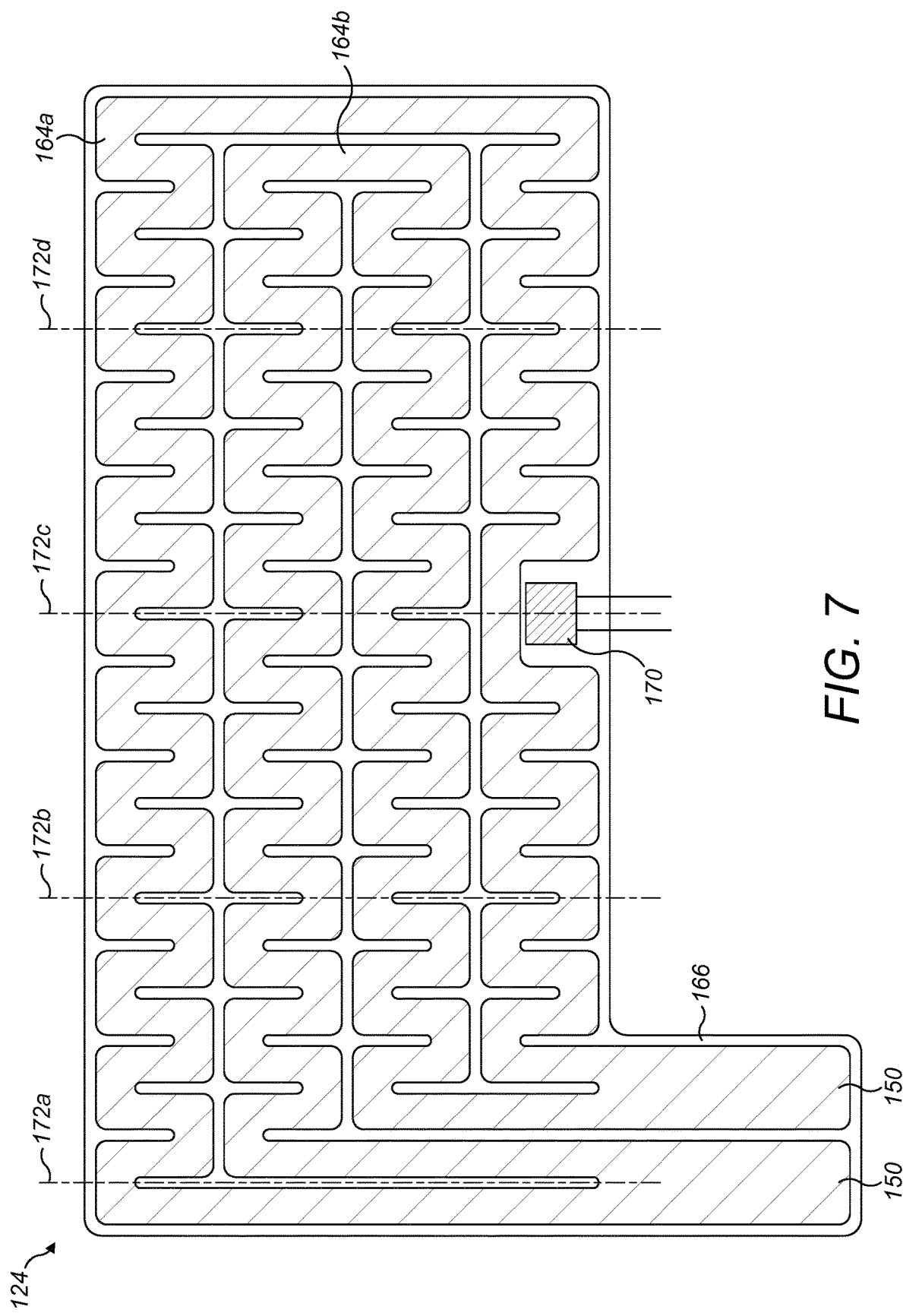
FIG. 7 is a plan view of the heater separated from the heating chamber.

The heater 124 comprises a heating element 164, electrical connection tracks 150 and a backing film 166 as shown in FIG. 7. The heating element 164 is configured such that when current is passed through the heating element 164 the heating element 164 heats up and increases in temperature. The heating element 164 is shaped so that it contains no sharp corners. Sharp corners may induce hotspots in the heater 124, or create fuse points. The heating element 164 is also of uniform width, and parts of the element 164 which run close to one another are held approximately an equal distance apart. The heating element 164 of FIG. 7 shows two resistive paths 164a, 164b which each take a serpentine path over the area of the heater 124, covering as much of the area as possible while complying with the above criteria. These paths 164a, 164b are arranged electrically in parallel with one another in FIG. 7. It is noted that other numbers of paths may be used, for example three paths, one path, or numerous paths. The paths 164a, 164b do not cross as this would create a short circuit. The heating element 164 is configured to have a resistance so as to create the correct power density for the level of heating required. In some examples the heating element 164 has a resistance between 0.4Ω and 2.0Ω, and particularly advantageously between 0.5Ω and 1.5Ω, and more particularly between 0.6Ω and 0.7Ω.

The electrical connection tracks 150 are shown as part of the heater 124, but may be replaced in some embodiments by wires or other connecting elements. The electrical connections 150 are used to provide power to the heating element 164, and form a circuit with the power source 120. The electrical connection tracks 150 are shown extending vertically down from the heating element 164. With the heater 124 in position, the electrical connections 150 extend past the base 112 of the heating chamber 108 and through the base 156 of the insulating member 152 to connect with the control circuitry 122.

The backing film 166 may either be a single sheet with a heating element 164 attached, or may form an envelope sandwiching the heating element between two sheets 166a, 166b. The backing film 166 in some embodiments is formed of polyimide. In some embodiments the thickness of the backing film 166 is minimised so as to reduce the thermal mass of the heater 124. For example, the thickness of the backing film 166 may be 50 μm, or 40 μm, or 25 μm.

The heating element 164 attaches to the side wall 108. In FIG. 7 the heating element 164 is configured to wrap one time around the heating chamber 108, by carefully selecting the size of heater 124. This ensures that the heat produced by the heater 124 is distributed approximately evenly around the surface covered by the heater 124. It is noted that rather than one full wrap the heater 124 may wrap a whole number of times around the heating chamber 108 in some examples.

It is also noted that the height of the heater 124 is approximately 14 mm to 15 mm. The circumference of the heater 124 (or its length before being applied to the heating chamber 108) is approximately 24 mm to 25 mm. The height of the heating element 164 may be less than 14 mm. This enables the heating element 164 to be positioned fully within the backing film 166 of the heater 124, with a border around the heating element 164. The area covered by the heater 124 may therefore in some embodiments be approximately 3.75 cm$^2$.

The power used by the heater 124 is provided by the power source 120, which in this embodiment is in the form of a cell (or battery). The voltage provided by the power source 120 is a regulated voltage or a boosted voltage. For example, the power source 120 may be configured to generate voltage in the range 2.8 V to 4.2 V. In one example, the power source 120 is configured to generate a voltage of 3.7 V. Taking an exemplary resistance of the heating element 164 in one embodiment to be 0.6Ω, and the exemplary voltage to be 3.7 V, this would develop a power output of approximately 30 W in the heating element 164. It is noted based on the exemplary resistances and voltages the power output may be between 15 W and 50 W. The cell forming the power source 120 may be a rechargeable cell, or alternatively may be a single use cell 120. The power source is typically configured so that it can provide power for 20 or more heat cycles. This enables a full packet of 20 substrate carriers 114 to be used by the user on a single charge of the aerosol generation device 100. The cell may be a lithium ion cell, or any other type of commercially available cell. It may for example be an 18650 cell, or an 18350 cell. If the cell is an 18350 cell the aerosol generation device 100 may be configured to store enough charge for 12 heat cycles or indeed 20 heat cycles, to allow a user to consume 12 or even 20 substrate carriers 114.

One important value for a heater 124 is the power per unit area that it produces. This is a measure of how much heat may be provided by the heater 124 to the area in contact with it (in this case the heating chamber 108). For the examples described, this ranges from 4 W/cm$^2$ to 13.5 W/cm$^2$. Heaters are generally rated for maximum power densities of between 2 W/cm$^2$ and 10 W/cm$^2$, depending on the design. Therefore for some of these embodiments a copper or other conductive metal layer 144 may be provided on the heating chamber 108 to conduct the heat efficiently from the heater 124 and reduce the likelihood of damage to the heater 124.

The power delivered by the heater 124 may in some embodiments be constant, and in other embodiments may not be constant. For example, the heater 124 may provide variable power through a duty cycle, or more specifically in a pulse width modulation cycle. This allows the power to be delivered in pulses and the time averaged power output by the heater 124 to be easily controlled by simply selecting the ratio of "on" time to "off" time. The level of the power output by the heater 124 may also be controlled by additional control means, such as current or voltage manipulation.

As shown in FIG. 7, the aerosol generation device 100 has a temperature sensor 170 for detecting the temperature of the heater 124, or the environment surrounding the heater 124. The temperature sensor 170 may for example be a thermistor, a thermocouple, or any other thermometer. A thermistor for example may be formed of a glass bead encapsulating a resistive material connected to a voltmeter and having a known current flowing through it. Thus, when the temperature of the glass changes, the resistance of the resistive material changes in a predictable fashion, and such the temperature can be ascertained from the voltage drop across it at the constant current (constant voltage modes are also possible). In some embodiments, the temperature sensor 170 is positioned on a surface of the heating chamber 108, e.g. in an indentation formed in the outer surface of the heating chamber 108. The indentation may be one such as those described herein elsewhere, e.g. as part of the protrusions 140, or it may be an indentation specifically provided for holding the temperature sensor 170. In the illustrated embodiment, the temperature sensor 170 is provided on the backing layer 166 of the heater 124. In other embodiments, temperature sensor 170 is integral with the heating element 164 of the heater 124, in the sense that temperature is detected by monitoring the change in resistance of the heating element 164.

In the aerosol generating device 100 of the first embodiment, the time to first puff after initiation of the aerosol generation device 100 is an important parameter. A user of the aerosol generation device 100 will find it preferable to start inhaling aerosol from the substrate carrier 128 as soon as possible, with the minimum lag time between initiating the aerosol generation device 100 and inhaling aerosol from the substrate carrier 128. Therefore, during the first stage of heating the power source 120 provides 100% of available power to the heater 124, for example by setting a duty cycle to always on, or by manipulating the product of voltage and current to its maximum possible value. This may be for a period of 30 seconds, or more preferably for a period of 20 seconds, or for any period until the temperature sensor 170 gives a reading corresponding to 240° C. Typically the substrate carrier 114 may operate optimally at 180° C. but it may nevertheless be advantageous to heat the temperature sensor 170 to exceed this temperature, such that the user can extract aerosol from the substrate carrier 114 as quickly as possible. The reason for this is that the temperature of the aerosol substrate 128 typically lags behind (i.e. is lower than) the temperature detected by the temperature sensor 170 because the aerosol substrate 128 is heated by convection of warmed air through the aerosol substrate 128, and to an extent by conduction between the protrusions 140 and the outer surface of the substrate carrier 114. By contrast, the temperature sensor 170 is held in good thermal contact with the heater 124, so measures a temperature close to the temperature of the heater 124, rather than the temperature of the aerosol substrate 128. It can in fact be difficult to accurately measure the temperature of the aerosol substrate 128 so the heating cycle is often determined empirically where different heating profiles and heater temperatures are tried and the aerosol generated by the aerosol substrate 128 is monitored for the different aerosol components which are formed at that temperature. Optimum cycles provide aerosols as quickly as possible but avoid the generation of combustion products due to overheating of the aerosol substrate 128.

The temperature detected by the temperature sensor 170 may be used to set the level of power delivered by the cell 120, for example by forming a feedback loop, in which the temperature detected by the temperature sensor 170 is used to control a heater powering cycle. The heating cycle described below may be for the case in which a user wishes to consume a single substrate carrier 114.

In the first embodiment, the heater 124 extends around the heating chamber 108. That is, the heater 124 surrounds the heating chamber 108. In more detail, the heater 124 extends around the side wall 126 of the heating chamber 108, but not around the base 112 of the heating chamber 108. The heater 124 does not extend over the entire side wall 126 of the heating chamber 108. Rather, it extends all the way around the side wall 126, but only over part of the length of the side wall 126, the length in this context being from the base 112 to the open end 110 of the heating chamber 108. In other embodiments, the heater 124 extends over the entire length of the side wall 126. In yet other embodiments, the heater 124 comprises two heating portions separated by a gap, leaving a central portion of the heating chamber 108 uncovered, e.g. a portion of the side wall 126 mid-way between the base 112 and the open end 110 of the heating chamber 108. In other embodiments, since the heating chamber 108 is cup-shaped, the heater 110 is similarly cup-shaped, e.g. it extends completely around the base 112 of the heating chamber 108. In yet other embodiments, the heater 124 comprises multiple heating elements 164 distributed proximate to the heating chamber 108. In some embodiments, there are spaces between the heating elements 164; in other embodiments they overlap one another. In some embodiments the heating elements 164 may be spaced around a circumference of the heating chamber 108 or side wall 126, e.g. laterally, in other embodiments the heating elements 164 may be spaced along the length of the heating chamber 108 or side wall 126, e.g. longitudinally. It will be understood that the heater 124 of the first embodiment is provided on an external surface of the heating chamber 108, outside of the heating chamber 108. The heater 124 is provided in good thermal contact with the heating chamber 108, to allow for good transfer of heat between the heater 124 and the heating chamber 108.

The metallic layer 144 may be formed from copper or any other material (e.g. metal or alloy) of high thermal conductivity, for example gold or silver. In this context, high thermal conductivity may refer to a metal or alloy having a thermal conductance of 150 W/mK or higher. The metallic layer 144 can be applied by any suitable method, for example electroplating. Other methods for applying the layer 144 include sticking metallic tape to the heating chamber 108, chemical vapour deposition, physical vapour deposition, etc. While electroplating is a convenient method for applying a layer 144, it requires that the part onto which the layer 144 is plated is electrically conductive. This is not so with other deposition methods, and these other methods open up the possibility that the heating chamber 108 is formed from electrically non-conductive materials, such as ceramics, which may have useful thermal properties. Also, where a layer is described as metallic, while this usually should be taken to mean "formed from a metal or alloy", in this context it refers to a relatively high thermal conductivity material (>150 W/mK). Where the metallic layer 144 is electroplated on to the side wall 126, it may be necessary to first form a "strike layer" to ensure that the electroplated layer adheres to the outer surface. For example, where the metallic layer 144 is copper and the side wall 126 is stainless steel, a nickel strike layer is often used to ensure good adhesion. Electroplated layers and deposited layers have the advantage that there is a direct contact between the metallic layer 144 and the material of the side wall 126, so improving thermal conductance between the two elements.

Whichever method is used to form the metallic layer 144, the thickness of the layer 144 is usually somewhat thinner than the thickness of the side wall 126. For example, the range of thicknesses of the metallic layer may be between 10 µm and 50 µm, or between 10 µm and 30 µm, for example around 20 µm. Where a strike layer is used, this is even thinner than the metallic layer 144, for example 10 µm or even 5 µm. As described in more detail below, the purpose of the metallic layer 144 is to distribute heat generated by the heater 124 over a larger area than that occupied by the heater 124. Once this effect has been satisfactorily achieved, there is little benefit in making the metallic layer 144 yet thicker, as this merely increases thermal mass and reduces the efficiency of the aerosol generation device 100.

It will be apparent from FIGS. 1 to 6 that the metallic layer 144 extends only over a part of the outer surface of the side wall 126. Not only does this reduce the thermal mass of the heating chamber 108, but it allows the definition of a heating region. Broadly, the metallic layer 144 has a higher thermal conductivity than the side wall 126, so heat produced by the heater 124 spreads quickly over the area covered by the metallic layer 144, but due to the side wall 126 being both thin and of relatively lower thermal conductivity than the metallic layer 144, the heat remains relatively localised in the regions of the side wall 126 which are covered by the metallic layer 144. Selective electroplating is achieved by masking the parts of the heating chamber 108 with a suitable tape (e.g. polyester or polyimide) or silicone rubber moulds. Other plating methods may make use of different tapes or masking methods as appropriate.

As shown in FIGS. 1 to 6, the metallic layer 144 overlaps the whole length of the heating chamber 108 along which the protrusions/indentations 140 extend. This means that the protrusions 140 are heated by the thermally conductive effect of the metallic layer 144, which in turn allows the protrusions 140 to provide the conductive heating described above. The extent of the metallic layer 144 corresponds broadly to the extent of the heating region, so it is often unnecessary to extend the metallic layer to the top and bottom of the heating chamber 108 (i.e. nearest the open end and the base 112). As noted above, the region of the substrate carrier 114 which is to be heated starts a little way above the boundary of the aerosol substrate 128, and extends towards the end 134 of the substrate carrier 114, but in many cases does not include the end 134 of the substrate carrier 114. As noted above, the metallic layer 144 has the effect that the heat generated by the heater 124 is spread over a larger area than the area occupied by the heater 124 itself. This means that more power can be provided to the heater 124 than would nominally be the case based on its rated W/cm$^2$ and surface area occupied by the heater 124, because heat generated is spread over a larger area, so the effective area of the heater 124 is larger than the surface area actually occupied by the heater 124.

Since the heating zone can be defined by the portions of the side wall 126 which are covered by the metallic layer 144, the exact placement of the heater 124 on the outside of the heating chamber 108 is less critical. For example, rather than needing to align the heater 124 a particular distance from the top or bottom of the side wall 126, the metallic layer 144 can instead be formed in a very specific region, and the heater 124 placed over the top of the metallic layer 144 which spreads the heat over the metallic layer 144 region or heating zone, as described above. It is often simpler to standardise the masking process for electroplating or deposition than it is to exactly align a heater 124.

Similarly, where there are protrusions 140 formed by indenting the side wall 126, the indentations represent parts of the side wall 126 which will not be in contact with a heater 124 wrapped around the heating chamber 108; instead the heater 124 tends to bridge over the indentation, leaving a gap. The metallic layer 144 can help to mitigate this effect because even the parts of the side wall 126 which do not directly contact the heater 124 receive heat from the heater 124 by conduction via the metallic layer 144. In some cases, the heater element 164 may be arranged to minimise the overlap between the heater element 164 and the indent on the exterior surface of the side wall 126, for example by arranging the heating element 164 to cross over the indentation, but not to run along the indentation. In other cases, the heater 124 is positioned on the external surface of the side wall 126 such that the parts of the heater 124 overlying the indentations are the gaps between the heater elements 164. Whichever method is chosen to mitigate the effect of the heater 124 overlying an indentation, the metallic layer 144 mitigates the effect by conducting heat into the indentation. In addition, the metallic layer 144 provides additional thickness into the indented regions of the side wall 126, thereby providing additional structural support to these regions. Indeed, the additional thickness provided by the metallic layer 126 strengthens the thin side wall 126 at all parts covered by the metallic layer 144.

The metallic layer 144 can be formed before or after the step in which indentations are formed in the outer surface side wall 126 to provide protrusions 140 extending into the heating chamber 108. It is preferred to form the indentations before the metallic layer because once the metallic layer 144 is formed steps such as annealing tend to damage the metallic layer 144, and stamping the side wall 126 to form protrusions 140 becomes more difficult due to the increased thickness of the side wall 126 in combination with the metallic layer 144. However, in the case where the indentations are formed before the metallic layer 144 is formed on the side wall 126, it is much easier to form the metallic layer 144 such that it extends beyond (i.e. above and below) the indentations because it is difficult to mask the outer surface of the side wall 126 in such a way that it extends into the indentation. Any gap between the masking and the side wall 126 can result in metallic layer 144 being deposited underneath the masking.

Wrapped around the heater 124 is a thermally insulating layer 146. This layer 146 is under tension, so providing a compressive force on the heater 124, holding the heater 124 tightly against the outer surface of the side wall 126. Advantageously, this thermally insulating layer 146 is a heat shrink material. This allows the thermally insulating layer 146 to be wrapped tightly around the heating chamber (over the heater 124, metallic layer 144, etc.) and then heated. Upon heating the thermally insulating layer 146 contracts and presses the heater 124 tightly against the outer surface of the side wall 126 of the heating chamber 108. This eliminates any air gaps between the heater 124 and the side wall 126 and holds the heater 124 in very good thermal contact with the side wall. This in turn ensures good efficiency, since the heat produced by the heater 124 results in heating of the side wall (and subsequently the aerosol substrate 128) and is not wasted heating air or leaking away in other ways.

The preferred embodiment uses a heat shrink material, e.g. treated polyimide tape, which shrinks only in one dimension. For example, in the polyimide tape example, the tape may be configured to shrink only in the length direction. This means that the tape can be wrapped around the heating chamber 108 and heater 124 and on heating will contract and press the heater 124 against the side wall 126. Because the thermally insulating layer 146 shrinks in the length direction, the force generated in this way is uniform and inwardly directed. Were the tape to shrink in the transverse (width) direction this could cause ruffling of the heater 124 or the tape itself. This in turn would introduce gaps, and reduce the efficiency of the aerosol generation device 100.

Figure 4:
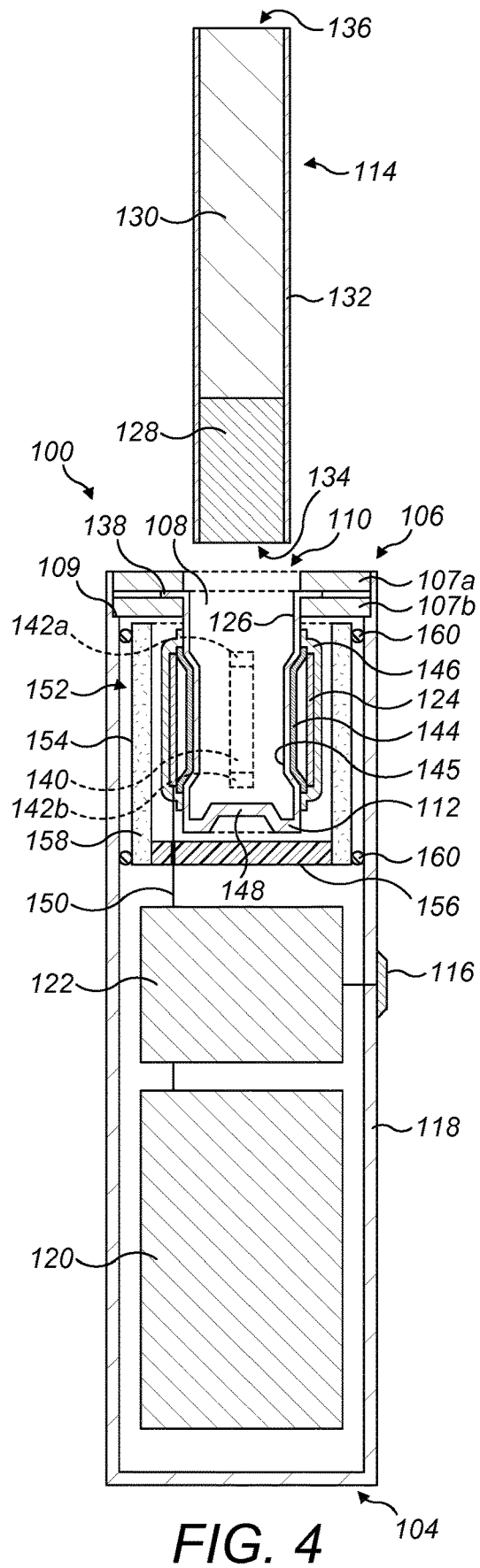
FIG. 4 is a schematic cross-sectional view from the side of the aerosol generation device of FIG. 1, shown with the substrate carrier of aerosol substrate being loaded into the aerosol generation device.
Figure 6:
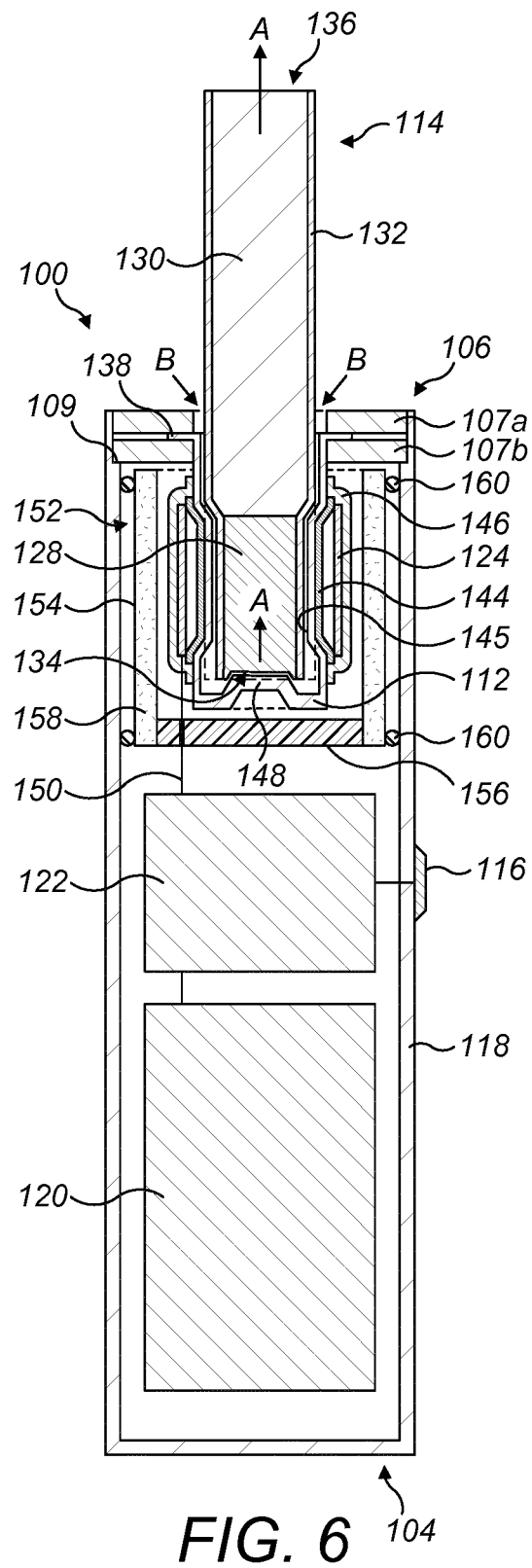
FIG. 6 is a schematic cross-sectional view from the side of the aerosol generation device of FIG. 1, shown with the substrate carrier of aerosol substrate loaded into the aerosol generation device.
Figure 6A:
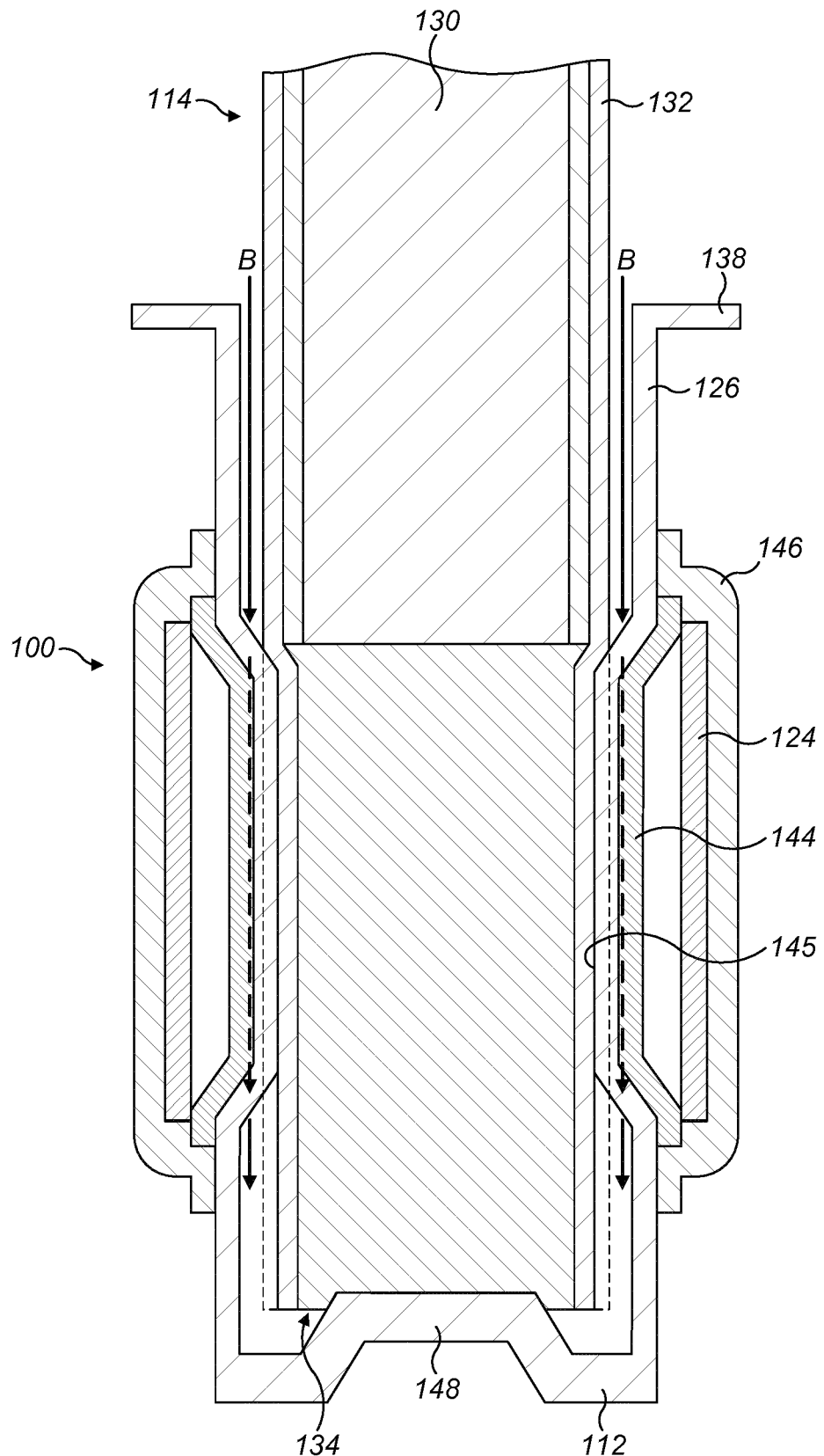
FIG. 6(a) is a detailed cross-sectional view of a portion of FIG. 6, highlighting the interaction between the substrate carrier and the protrusions in the heating chamber and the corresponding effect on the air flow paths.

Referring to FIGS. 3 to 6, the substrate carrier 114 comprises a pre-packaged amount of the aerosol substrate 128 along with an aerosol collection region 130 wrapped in an outer layer 132. The aerosol substrate 128 is located towards the first end 134 of the substrate carrier 114. The aerosol substrate 128 extends across the entire width of the substrate carrier 114 within the outer layer 132. They also abut one another part way along the substrate carrier 114, meeting at a boundary. Overall, the substrate carrier 114 is generally cylindrical. The aerosol generation device 100 is shown without the substrate carrier 114 in FIGS. 1 and 2. In FIGS. 3 and 4, the substrate carrier 114 is shown above the aerosol generation device 100, but not loaded in the aerosol generation device 100. In FIGS. 5 and 6 the substrate carrier 114 is shown loaded in the aerosol generation device 100.

When a user wishes to use the aerosol generation device 100, the user first loads the aerosol generation device 100 with the substrate carrier 114. This involves inserting the substrate carrier 114 into the heating chamber 108. The substrate carrier 114 is inserted into the heating chamber 108 oriented such that the first end 134 of the substrate carrier 114, towards which the aerosol substrate 128 is located, enters the heating chamber 108. The substrate carrier 114 is inserted into the heating chamber 108 until the first end 134 of the substrate carrier 114 rests against the platform 148 extending inwardly from the base 112 of the heating chamber 108, that is until the substrate carrier 114 can be inserted into the heating chamber 108 no further. In the embodiment shown, as described above, there is an additional effect from the interaction between the upper edge 142a of the protrusions 140 and the boundary of the aerosol substrate 128 and the less compressible adjacent region of the substrate carrier 114 which alerts the user that the substrate carrier 114 has been inserted sufficiently far into the aerosol generation device 100. It will be seen from FIGS. 3 and 4 that when the substrate carrier 114 has been inserted into the heating chamber 108 as far as it will go, only a part of the length of the substrate carrier 114 is inside the heating chamber 108. A remainder of the length of the substrate carrier 114 protrudes from the heating chamber 108. At least a part of the remainder of the length of the substrate carrier 114 also protrudes from the second end 106 of the aerosol generation device 100. In the first embodiment, all of the remainder of the length of the substrate carrier 114 protrudes from the second end 106 of the aerosol generation device 100. That is, the open end 110 of the heating chamber 108 coincides with the second end 106 of the aerosol generation device 100. In other embodiments all, or substantially all, of the substrate carrier 114 may be received in the aerosol generation device 100, such that none or substantially none of the substrate carrier 114 protrudes from the aerosol generation device 100.

With the substrate carrier 114 inserted into the heating chamber 108, the aerosol substrate 128 within the substrate carrier 114 is arranged at least partially within the heating chamber 108. In the first embodiment, the aerosol substrate 128 is wholly within the heating chamber 108. Indeed, the pre-packaged amount of the aerosol substrate 128 in the substrate carrier 114 is arranged to extend along the substrate carrier 114 from the first end 134 of the substrate carrier 114 by a distance that is approximately (or even exactly) equal to an internal height of the heating chamber 108 from the base 112 to the open end 110 of the heating chamber 108. This is effectively the same as the length of the side wall 126 of the heating chamber 108, inside the heating chamber 108.

With the substrate carrier 114 loaded in the aerosol generation device 100, the user switches the aerosol generation device 100 on using the user-operable button 116. This causes electrical power from the electrical power source 120 to be supplied to the heater 124 via (and under the control of) the control circuitry 122. The heater 124 causes heat to be conducted via the protrusions 140 into the aerosol substrate 128, heating the aerosol substrate 128 to a temperature at which it can begin to release vapour. Once heated to a temperature at which the vapour can begin to be released, the user may inhale the vapour by sucking the vapour through the second end 136 of the substrate carrier 114. That is, the vapour is generated from the aerosol substrate 128 located at the first end 134 of the substrate carrier 114 in the heating chamber 108 and drawn along the length of the substrate carrier 114, through the vapour collection region 130 in the substrate carrier 114, to the second end 136 of the substrate carrier, where it enters the user's mouth. This flow of vapour is illustrated by arrow A in FIG. 6.

It will be appreciated that, as a user sucks vapour in the direction of arrow A in FIG. 6, vapour flows from the vicinity of the aerosol substrate 128 in the heating chamber 108. This action draws ambient air into the heating chamber 108 (via flow paths indicated by arrows B in FIG. 6, and shown in more detail in FIG. 6(a)) from the environment surrounding the aerosol generation device 100. This ambient air is then heated by the heater 124 which in turn heats the aerosol substrate 128 to cause generation of aerosol. More specifically, in the first embodiment, air enters the heating chamber 108 through space provided between the side wall 126 of the heating chamber 108 and the outer layer 132 of the substrate carrier 114. An outer diameter of the substrate carrier 114 is less than an inner diameter of the heating chamber 108, for this purpose. More specifically, in the first embodiment, the heating chamber 108 has an internal diameter (where no protrusion is provided, e.g. in the absence of or between the protrusions 140) of 10 mm or less, preferably 8 mm or less and most preferably approximately 7.6 mm. This allows the substrate carrier 114 to have a diameter of approximately 7.0 mm (±0.1 mm) (where it is not compressed by the protrusions 140). This corresponds to an outer circumference of 21 mm to 22 mm, or more preferably 21.75 mm. In other words, the space between the substrate carrier 114 and the side wall 126 of the heating chamber 108 is most preferably approximately 0.1 mm. In other variations, the space is at least 0.2 mm, and in some examples up to 0.3 mm. Arrows B in FIG. 6 illustrate the direction in which air is drawn into the heating chamber 108.

When the user activates the aerosol generation device 100 by actuating the user-operable button 116, the aerosol generation device 100 heats the aerosol substrate 128 to a sufficient temperature to cause vaporisation of parts of the aerosol substrate 128. In more detail, the control circuitry 122 supplies electrical power from the electrical power source 120 to the heater 124 to heat the aerosol substrate 128 to a first temperature. When the aerosol substrate 128 reaches the first temperature, components of the aerosol substrate 128 begin to vaporise, that is the aerosol substrate produces vapour. Once vapour is being produced, the user can inhale the vapour through the second end 136 of the substrate carrier 114. In some scenarios, the user may know that it takes a certain amount of time for the aerosol generation device 100 to heat the aerosol substrate 128 to the first temperature and for the aerosol substrate 128 to start to produce vapour. This means that the user can judge for himself when to start inhaling the vapour. In other scenarios, the aerosol generation device 100 is arranged to issue an indication to the user that vapour is available for inhalation. Indeed, in the first embodiment, the control circuitry 122 causes the user operable button 116 to illuminate when the aerosol substrate 128 has been at the first temperature for an initial period of time. In other embodiment, the indication is provided by another indicator, such as by generating an audio sound or by causing a vibrator to vibrate. Similarly, in other embodiments, the indication is provided after a fixed period of time from the aerosol generation device 100 being activated, as soon as the heater 124 has reached an operating temperature or following some other event.

The user can continue to inhale vapour all the time that the aerosol substrate 128 is able to continue to produce the vapour, e.g. all the time that the aerosol substrate 128 has vaporisable components left to vaporise into a suitable vapour. The control circuitry 122 adjusts the electrical power supplied to the heater 124 to ensure that the temperature of the aerosol substrate 128 does not exceed a threshold level. Specifically, at a particular temperature, which depends on the constitution of the aerosol substrate 128, the aerosol substrate 128 will begin to burn. This is not a desirable effect and temperatures above and at this temperature are avoided. To assist in this, the aerosol generation device 100 is provided with a temperature sensor (not shown). The control circuitry 122 is arranged to receive an indication of the temperature of the aerosol substrate 128 from the temperature sensor and to use the indication to control the electrical power supplied to the heater 124. For example, in one scenario, the control circuitry 122 provides maximum electrical power to the heater 124 during an initial time period until the heater or chamber reaches the first temperature. Subsequently, once the aerosol substrate 128 has reached the first temperature, the control circuitry 122 ceases to supply electrical power to the heater 124 for a second time period until the aerosol substrate 128 reaches a second temperature, lower than the first temperature. Subsequently, once the heater 124 has reached the second temperature, the control circuitry 122 starts to supply electrical power to the heater 124 for a third time period until the heater 124 reaches the first temperature again. This may continue until the aerosol substrate 128 is expended (i.e. all aerosol which can be generated by heating has already been generated) or the user stops using the aerosol generation device 100. In another scenario, once the first temperature has been reached, the control circuitry 122 reduces the electrical power supplied to the heater 124 to maintain the aerosol substrate 128 at the first temperature but not increase the temperature of the aerosol substrate 128.

A single inhalation by the user is generally referred to a "puff". In some scenarios, it is desirable to emulate a cigarette smoking experience, which means that the aerosol generation device 100 is typically capable of holding sufficient aerosol substrate 128 to provide ten to fifteen puffs.

In some embodiments the control circuitry 122 is configured to count puffs and to switch off the heater 124 after ten to fifteen puffs have been taken by a user. Puff counting is performed in one of a variety of different ways. In some embodiments, the control circuitry 122 determines when a temperature decreases during a puff, as fresh, cool air flows past the temperature sensor 170, causing cooling which is detected by the temperature sensor. In other embodiments, air flow is detected directly using a flow detector. Other suitable methods will be apparent to the skilled person. In other embodiments, the control circuitry additionally or alternatively switches off the heater 124 after a predetermined amount of time has elapsed since a first puff. This can help to both reduce power consumption, and provide a back-up for switching off in the event that the puff counter fails to correctly register that a predetermined number of puffs has been taken.

In some examples, the control circuitry 122 is configured to power the heater 124 so that it follows a predetermined heating cycle, which takes a predetermined amount of time to complete. Once the cycle is complete, the heater 124 is switched off entirely. In some cases, this cycle may make use of a feedback loop between the heater 124 and a temperature sensor (not shown). For example, the heating cycle may be parameterised by a series of temperatures to which the heater 124 (or, more accurately the temperature sensor) is heated or allowed to cool. The temperatures and durations of such a heating cycle can be empirically determined to optimise the temperature of the aerosol substrate 128. This may be necessary as direct measurement of the aerosol substrate temperature can be impractical, or misleading, for example where the outer layer of aerosol substrate 128 is a different temperature to the core.

In the following example the time to first puff is 20 seconds. After this point the level of power supplied to the heater 124 is reduced from 100% such that temperature remains constant at approximately 240° C. for a period of about 20 seconds. The power supplied to the heater 124 can then be reduced further such that the temperature recorded by the temperature sensor 170 reads approximately 200° C. This temperature may be held for approximately 60 seconds. The power level may then be further reduced such that the temperature measured by the temperature sensor 170 drops to the operating temperature of the substrate carrier 114, which in the present case is approximately 180° C. This temperature may be held for 140 seconds. This time interval may be determined by the length of time for which the substrate carrier 114 may be used. For example, the substrate carrier 114 may stop producing aerosol after a set period of time, and therefore the time period where the temperature is set to 180° C. may allow the heating cycle to last for this duration. After this point the power supplied to the heater 124 may be reduced to zero. Even when the heater 124 has been switched off, aerosol or vapour generated while the heater 124 was on can still be drawn out of the aerosol generation device 100 by a user sucking on it. Therefore, even when the heater 124 is turned off, a user may be alerted to this situation by a visual indicator remaining on, although the heater 124 has already switched off in preparation for the end of an aerosol inhalation session. In some embodiments this set period may be 20 seconds. The total time duration of the heating cycle may in some embodiments be approximately 4 minutes.

The above exemplary heat cycle may be altered by the use of the substrate carrier 114 by the user. When a user extracts the aerosol from the substrate carrier 114 the breath of the user encourages cold air through the open end of the heating chamber 108, towards the base 112 of the heating chamber 108, flowing down past the heater 124. The air may then enter the substrate carrier 114 through the tip 134 of the substrate carrier 114. The entrance of cold air into the cavity of the heating chamber 108 reduces the temperature measured by the temperature sensor 170 as cold air replaces the hot air which was previously present. When the temperature sensor 170 senses that the temperature has been reduced this may be used to increase the power supplied by the cell to the heater to heat the temperature sensor 170 back to the operating temperature of the substrate carrier 114. This may be achieved by supplying the maximum amount of power to the heater 124, or alternatively by supplying an amount of power greater than the amount required to keep the temperature sensor 170 reading a steady temperature.

The electrical power source 120 is sufficient to at least bring the aerosol substrate 128 in a single substrate carrier 114 up to the first temperature and maintain it at the first temperature to provide sufficient vapour for the at least ten to fifteen puffs. More generally, in line with emulating the experience of cigarette smoking, the electrical power supply 120 is usually sufficient to repeat this cycle (bring the aerosol substrate 128 up to the first temperature, maintain the first temperature and vapour generation for ten to fifteen puffs) ten times, or even twenty times, thereby emulating a user's experience of smoking a packet of cigarettes, before there is a need to replace or recharge the electrical power supply 120.

In general, the efficiency of the aerosol generation device 100 is improved when as much as possible of the heat that is generated by the heater 124 results in heating of the aerosol substrate 128. To this end, the aerosol generation device 100 is usually configured to provide heat in a controlled manner to the aerosol substrate 128 while reducing heat flow to other parts of the aerosol generation device 100. In particular, heat flow to parts of the aerosol generation device 100 that the user handles is kept to a minimum, thereby keeping these parts cool and comfortable to hold, for example by way of insulation as described herein in more detail.

It can be appreciated from FIGS. 1 to 6 and the accompanying description that, according to the first embodiment, there is provided a heating chamber 108 for the aerosol generation device 100, the heating chamber 108 comprising the open end 110, the base 112 and the side wall 126 between the open end 110 and the base 112, wherein the side wall 126 has a first thickness and the base 112 has a second thickness greater than the first thickness. The reduced thickness of the side wall 126 can help to reduce the power consumption of the aerosol generation device 100, as it requires less energy to heat the heating chamber 108 to the desired temperature.

Second Embodiment

A second embodiment is now described with reference to FIG. 8. The aerosol generation device 100 of the second embodiment is identical to the aerosol generation device 100 of the first embodiment described with reference to FIGS. 1 to 6, except where explained below, and the same reference numerals are used to refer to similar features. The aerosol generation device 100 of the second embodiment has an arrangement for allowing air to be drawn into the heating chamber 108 during use that is different to that of the first embodiment.

Figure 8:
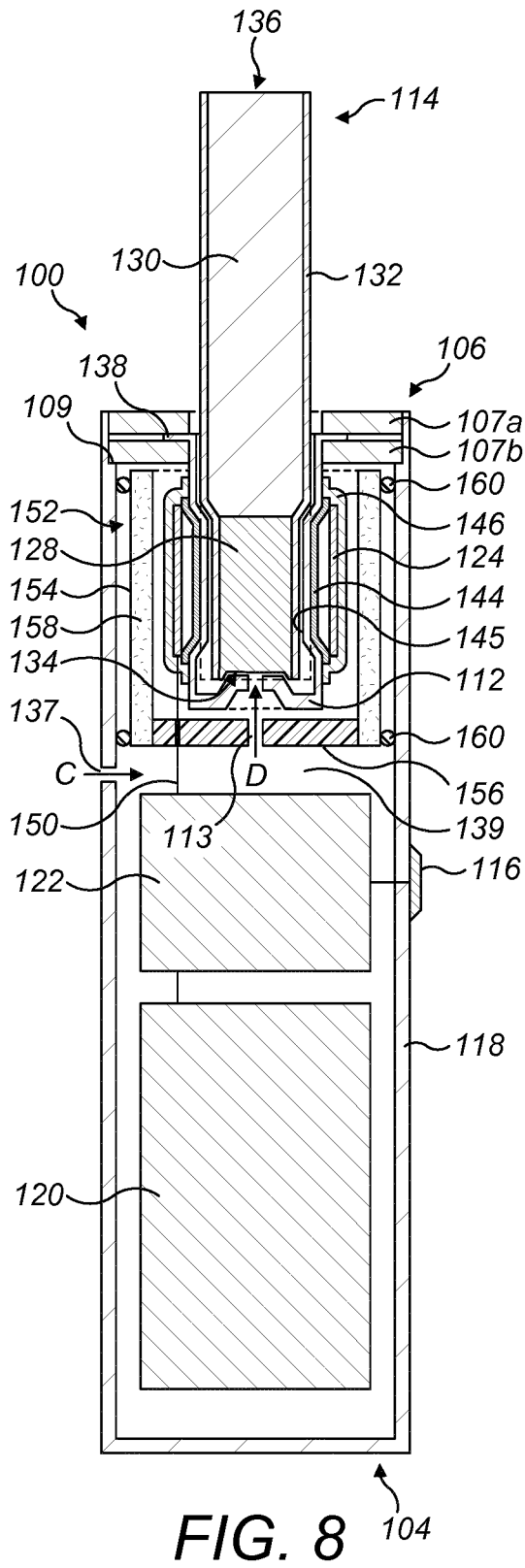
FIG. 8 is a schematic cross-sectional view from the side of an aerosol generation device according to a second embodiment of the disclosure having an alternative air flow arrangement.

In more detail, referring to FIG. 8, a channel 113 is provided in the base 112 of the heating chamber 108. The channel 113 is located in the middle of the base 112. It extends through the base 112, so as to be in fluid communication with the environment outside of the outer casing 102 of the aerosol generation device 100. More specifically, the channel 113 is in fluid communication with an inlet 137 in the outer casing 102.

The inlet 137 extends through the outer casing 102. It is located part way along the length of the outer casing 102, between the first end 104 and the second end 106 of the aerosol generation device 100. In the second embodiment, the outer casing defines a void 139 proximate to the control circuitry 122 and between the inlet 137 in the outer casing 102 and the channel 113 in the base 112 of the heating chamber 108. The void 139 provides fluid communication between the inlet 137 and the channel 113 so that air can pass from the environment outside of the outer casing 102 into the heating chamber 108 via the inlet 137, the void 139 and the channel 113.

During use, as vapour is inhaled by the user at the second end 136 of the substrate carrier 114, air is drawn into the heating chamber 108 from the environment surrounding the aerosol generation device 100. More specifically, air passes through the inlet 137 in the direction of arrow C into the void 139. From the void 139, the air passes through the channel 113 in the direction of arrow D into the heating chamber 108. This allows initially the vapour, and then the vapour mixed with the air, to be drawn through the substrate carrier 114 in the direction of arrow D for inhalation by the user at the second end 136 of the substrate carrier 114. The air is generally heated as it enters the heating chamber 108, such that the air assists in transferring heat to the aerosol substrate 128 by convection.

It will be appreciated that the air flow path through the heating chamber 108 is generally linear in the second embodiment, that is to say the path extends from the base 112 of the heating chamber 108 to the open end 110 of the heating chamber 108 in a broadly straight line. The arrangement of the second embodiment also allows the gap between the side wall 126 of the heating chamber 108 and the substrate carrier to be reduced. Indeed, in the second embodiment, the diameter of the heating chamber 108 is less than 7.6 mm, and the space between the substrate carrier 114 of 7.0 mm diameter and the side wall 126 of the heating chamber 108 is less than 1 mm.

In variations of the second embodiment, the inlet 137 is located differently. In one particular embodiment, the inlet 137 is located at the first end 104 of the aerosol generation device 100. This allows the passage of air through the entire aerosol generation device 100 to be broadly linear, e.g. with air entering the aerosol generation device 100 at the first end 104, which is typically oriented distal to the user during use, flowing through (or over, past, etc.) the aerosol substrate 128 within the aerosol generation device 100 and out into the user's mouth at the second end 136 of the substrate carrier 114, which is typically oriented proximal to the user during use, e.g. in the user's mouth.

Third Embodiment

A third embodiment is now described with reference to FIGS. 9 and 10. The heating chamber 108 of the third embodiment may be identical to the heating chamber 108 of the first embodiment described with reference to FIGS. 1 to 6, except where explained below, and the same reference numerals are used to refer to similar features. It is also possible for the heating chamber 108 of the third embodiment to correspond to the heating chamber 108 of the second embodiment, e.g. with the channel 113 provided in the base 112 of the heating chamber 108, except as described below, and this forms a further embodiment of the disclosure.

However, it is noted that the heating chamber 108 of the third embodiment may in itself be a stand-alone embodiment, and may be combined with the features of embodiments four to six to achieve the benefits highlighted below. The method of manufacturing the heating chamber in the third embodiment may also be a stand-alone embodiment.

Figure 9:
FIG. 9 shows a layer of heat shrink material.

FIG. 9 shows a layer of heat shrink material 146. A heat shrink material 146 is one that is configured such that, in response to heat, the dimensions of the material shrink, and once the heat source is removed, the heat shrink material 146 is plastically deformed to the new shrunk size. The heat shrink material 146 may referred to either as the heat shrink material, or as a heat shrink layer. Heat shrink materials can shrink in all three dimensions, however in some embodiments the aerosol generating device 100 uses a heat shrink material 146 that only shrinks in one dimension when laid out in a flat configuration. In some embodiments the heat shrink layer (146) contracts along the length of the tape in response to heating. To achieve the heat shrink material 146 shrinking in only one direction the heat shrink material 146 may be prepared by mechanically stretching the material to a first length, such that under heating it returns to that previous length. The heat shrink material 146 may be configured to have a thickness of 50 μm or less, or preferably 25 μm or less. The thickness of the heat shrink material 146 may be low such that the heat shrink material 146 adds only a small amount of thermal mass to the heating chamber 108 when applied. Moreover, in some embodiments, the heat shrink material 146 may be a thermal insulator such that heat from the heater 124 is more efficiently contained within the heating chamber 108. Therefore the thermal conductivity of the heat shrink material 146 may be less than that of the side wall 126 of the heating chamber 108. In some embodiments the heat shrink material 146 may be polyimide. For example, the heat shrink material 146 may be a heat shrink tape, for example made from polyimide. It is noted that in some embodiments the backing layer of the heater 124 may be comprised of the heat shrink material 146. Manufacturing the heater 124 attaches the heat shrink material 146 to the heating element 164. The heater 124 may then be applied to the heating chamber 108 as a single element. The heat shrink material 146 may have a width of 15 mm, and the heater 124 may have a width of 14 mm. The heat shrink material 146 may be polyimide and may be available from Dunstone Corporation.

Figure 10:
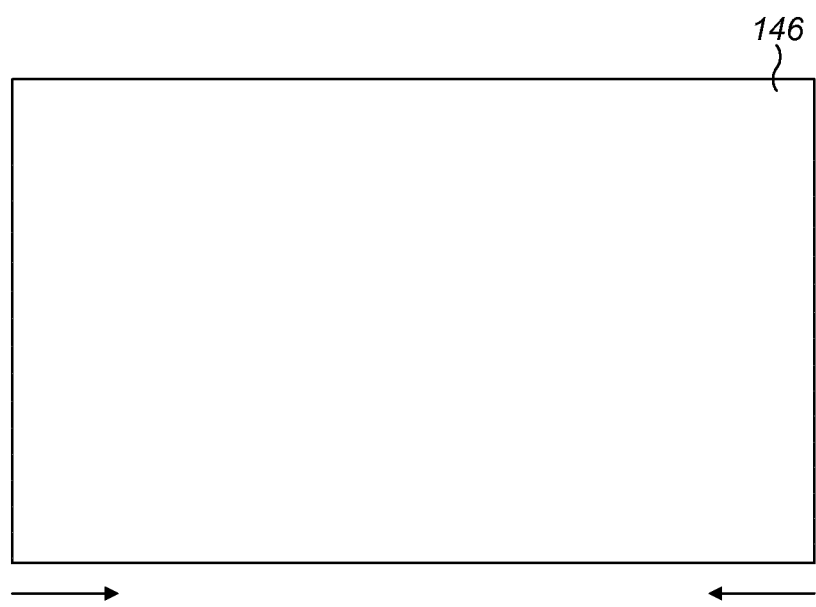
FIG. 10 shows a heat shrink layer after shrinking in one direction in response to heat.

FIG. 10 shows a layer of heat shrink material 146 after it has been shrunk by the application of heat. This shows that the length of the material 146 has decreased, but the width and depth of the material 146 remain unchanged. The heat shrink material 146 may be wrapped around the side wall 126 of the heating chamber 108, to compress the heater 124 to the side wall 126 after heating. The heat shrink material 146 may have a width that is greater than the width of the heater 124. This may mean that when the heat shrink material is heated, causing it to shrink in the length direction, it wraps around the heater. This may cause the heat shrink layer 146 to take the shape of the layer or layers that are covered by the heat shrink material 146. In this example, that shape being of the heater 124, and the heating chamber side wall 126. The shrinking of the heat shrink layer may seal the heater from exposure to the air and from any possible exposure to water. This is as the heat shrink deforms over the edges because the heat shrink material 146 is wider than the heater 124. Another effect of the heat shrink material 146 deforming over the edges of the underlying profile is that the heat shrink material 146 ends up having a U-shaped profile. This non-flat profile can help to prevent the heat shrink material 146 from unravelling, so improving the stability of the final product. The shrinking of the heat shrink material 146 causes a compression of the heater 124, and the chamber side wall 126, however this compression does not damage either the heater 124 or the side wall 126.

FIGS. 1 to 6 show an example of an aerosol generating device 100 that contains the heating chamber 108 described, as formed in the methods described below. The heating chamber 108 comprises a side wall 126 defining an interior volume of the heating chamber 108, a heater 124 in thermal contact with the side wall 126, and a heat shrink layer 146 under tension, compressing the heater 124 against an outwardly facing surface of the side wall 126. The heater 124 may be in direct contact with the outwardly facing surface of the side wall 126 as shown in FIG. 2. Direct contact in this case includes being in contact either with the side wall 126, or with an electroplated metal layer 144 on the side wall 126.

The side wall 126 and the heat shrink layer 146 together in some embodiments hermetically seal the heater 124. The heat shrink material is the heat shrink material 146 shown in FIGS. 9 and 10 in the third embodiment.

Fourth Embodiment

A fourth embodiment is now described with reference to FIGS. 11 to 14. The heating chamber 108 of the fourth embodiment may be identical to the heating chamber 108 of the first embodiment described with reference to FIGS. 1 to 6, except where explained below, and the same reference numerals are used to refer to similar features. It is also possible for the heating chamber 108 of the fourth embodiment to correspond to the heating chamber 108 of the second embodiment, e.g. with the channel 113 provided in the base 112 of the heating chamber 108, except as described below, and this forms a further embodiment of the disclosure.

However, it is noted that the heating chamber 108 of the fourth (and further) embodiment may in itself be a stand-alone embodiment, and may be combined with the features of embodiments five to six to achieve the benefits highlighted below. The method of manufacturing the heating chamber in the third embodiment may also be a stand-alone embodiment.

FIGS. 11 to 14 show steps in one embodiment of a method of manufacture of the heating chamber 108. The method may comprise the steps of providing a side wall 126, providing a heater 124, and arranging the heater 124 to be in thermal contact with the side wall 126. The method may further include attaching a heat shrink layer 146 to the outward facing side of the heater 124, and heating the heat shrink layer 146 to a temperature such that the heat shrink layer 146 shrinks to compress the heater 124 against the side wall 126.

Figure 11:
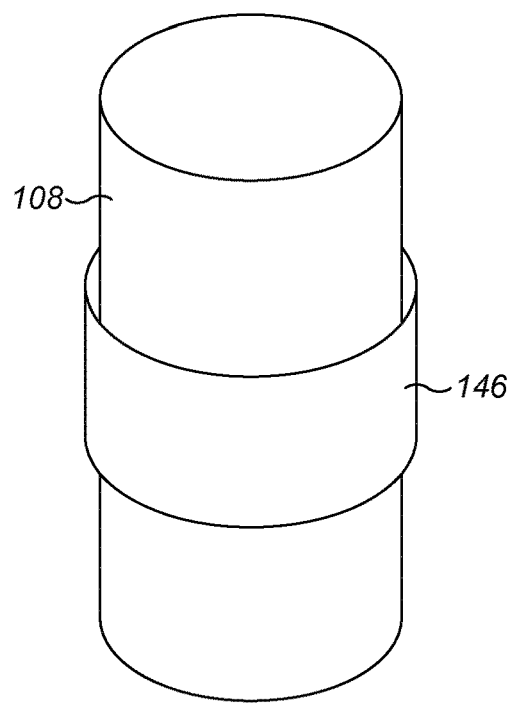
FIG. 11 shows the heat shrink layer wrapped around the heater attached to the side wall of the heating chamber before heating.

Before heating, in FIG. 11 the heat shrink layer 146 is wrapped around the heater 124 (which is attached to the side wall 126 of the heating chamber 108), wherein the heat shrink layer 146 is attached by adhesive 180. It is noted that the heat shrink layer 146 in FIG. 11 is overlaid on the heater 124, so the heater 124 cannot be seen in FIG. 11. The heater 124 is between the heat shrink layer 146 and the side wall 126. Moreover, the adhesive 180 can also not be seen directly in FIG. 11. The heater 124 is directly attached to the side wall 126 of the heating chamber 108. The heater 124 wraps once completely around the heating chamber 108 in FIG. 11. The heat shrink material 146 is attached to the heater 124 by a first portion of adhesive 180 located at a first end of the heat shrink material 146. The heat shrink layer 146 is then wrapped around the heater 124. The second end of the heat shrink material 146 (the end not already attached to the heater 124) is then attached by a second portion of adhesive 180 (also not shown on FIG. 11). This adhesive 180 is attached to the heat shrink material 146 such that the heat shrink material 146 stays in tension.

It is noted that in other embodiments the heat shrink material 146 may wrap almost the whole way around, but both portions of adhesive 180 may be attached to the heater 124, or alternatively a single portion of adhesive 180 may be used and the heat shrink material 146 wrapped exactly one time around the heater. Alternatively the heat shrink material 146 may be considerably wider than the heater 124 such that the adhesive 180 can be directly applied to the tubular structure of the heating chamber 108, rather than to the heater 124 itself. In some embodiments the heat shrink material 146 is wrapped at least two complete rotations around the side wall 126 of the heating chamber 108. In some embodiments the adhesive 180 may be silicone or a silicone based adhesive tape. In some embodiments such silicone may have a melting point of approximately 180° C. In other embodiments other adhesives 180 may be used that have melting points around or above 230° C., which corresponds approximately to the operational temperature of the device in some embodiments, that is, the highest temperature which the heating chamber 108 is expected to reach during the heating cycle described above in the first embodiment. For example resins with such a melting point may be used. The method may comprise heating the heat shrink layer (146) to a temperature not higher than the melting point of the silicon adhesive (if silicon is used) so as to cause the heat shrink layer (146) to contract, and then further heating the heat shrink layer (146) to an operation temperature of the device. Heating beyond the melting point of the adhesive risks the heat shrink layer 146 coming loose before it has fully gripped the heater 124 and heating chamber 108.

In alternative embodiments, the heater 124 is attached to the heat shrink material 146, which is then applied to the heating chamber 108 in a single process. In some embodiments the heater 124 is attached (e.g. by adhesive or by a small piece of tape 180) to one end of the heat shrink material 146. The heater 124 is then wrapped around the heating chamber 108, and the heat shrink material 146 attached to the heater 124 can subsequently be wrapped around the heater 124.

Figure 12:
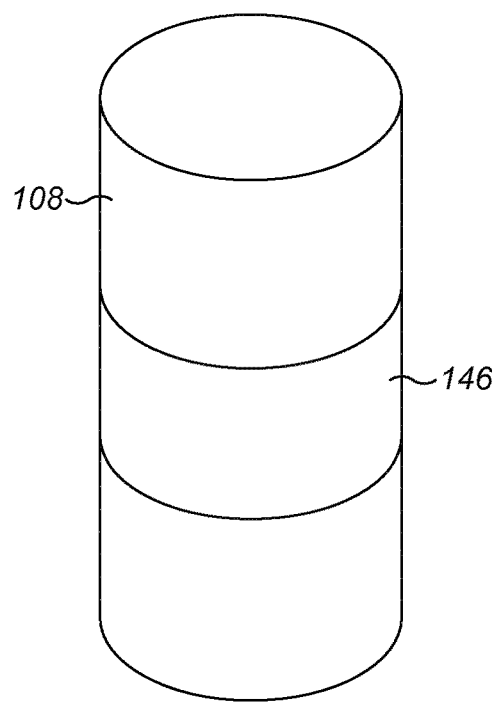
FIG. 12 shows the configuration of FIG. 11 after heating to a first temperature to shrink the heat shrink material.

FIG. 12 shows the configuration of FIG. 11 after heating to 180° C. In other examples, the heat shrink material 146 may be heated to approximately 170° C. The heat shrink material 146 may shrink by 8% in length over a period of approximately 15 minutes at 150° C. Therefore at 180° C. the shrinkage may be greater than 8%. At this temperature the adhesive 180 begins to melt, but the shrinkage applies tension to the heat shrink material 146 such that it remains attached to the tubular structure. As the heat shrink material 146 is shrinking it encapsulates the heater 124. In some embodiments the shrinkage may leave no air gap between the heat shrink material 146 and the heater 124. In some embodiments the heating of the heat shrink layer 146 moulds the heat shrink layer 146 to the shape of the tubular structure, and to the heater 124. It is noted that in some embodiments this may be the end of the manufacturing process for making the heating chamber 108.

Figure 13:
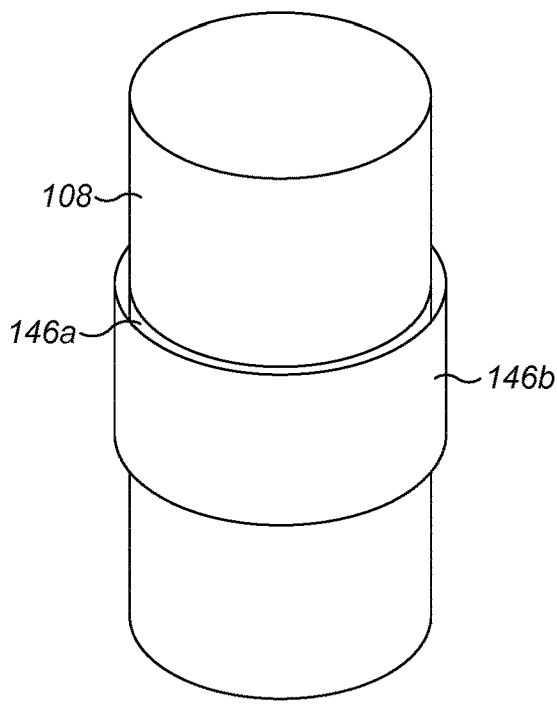
FIG. 13 shows the configuration of FIG. 12 with an additional wrap of heat shrink material around wrapped around the original heat shrink layer.

FIG. 13 shows the configuration of FIG. 12 with an additional layer of heat shrink material 146b wrapped around the original heat shrink layer 146a. The second layer of heat shrink material 146b shown in FIG. 13 is covered in a layer of adhesive on the interior side, however alternatively portions of adhesive 180 may be used. The adhesive 180 attaching the second layer of heat shrink material 146b to the first 146a may be silicone, or it may be an adhesive 180 with a higher melting point such as some resins.

Figure 14:
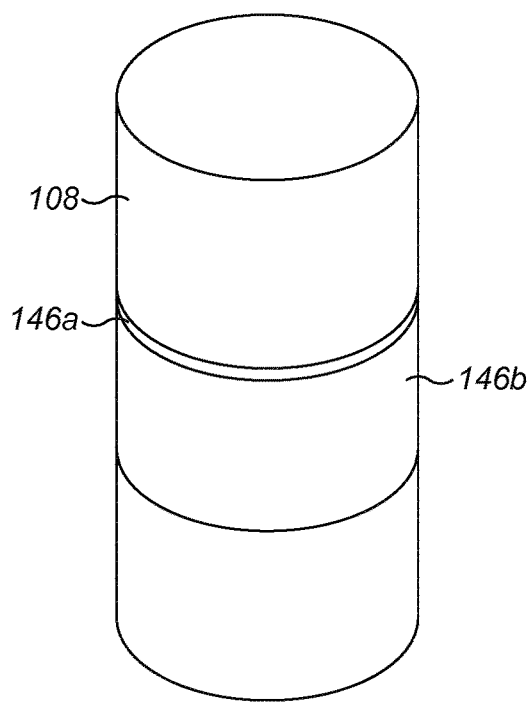
FIG. 14 shows the configuration of FIG. 13 after heating to a second temperature, higher than the first temperature, to further shrink the heat shrink material.

FIG. 14 shows the configuration of FIG. 13 after heating to 230° C. In other examples, the heat shrink layer 146 is heated to approximately 240° C. The second layer of heat shrink material 146b has contracted. The first layer of heat shrink material 146a has also contracted further. The heat shrink material 146 may be configured to shrink 12% in length in response to heating to 350° C. As 230° C. is a lower temperature, the shrinkage resulting from the two stage process may be between 8% and 12% in length. It is noted that in the embodiment where an adhesive 180 with a melting point of above 230° C. is used, a single stage process may be used to attach the heat shrink material 146 to the heating chamber 108. The heating chamber 108 may then be heated to 230° C. in one heating cycle so that no additional layers of heat shrink material 146 are used. After heating the heat shrink material 146 (in either one, two, or more heat cycles), the heat shrink layer 146 exerts a homogenous force on the heater 124.

It is also noted that in a further embodiment the heating described according to the embodiments described above is provided by heating the heater 124 to the temperatures described. In other embodiments the heating is provided by placing the heating chamber 108 and heat shrink material 146 in an oven or kiln.

Fifth Embodiment

A fifth embodiment is now described with reference to FIG. 15. The heating chamber 108 of the fifth embodiment may be identical to the heating chamber 108 of the first embodiment described with reference to FIGS. 1 to 6, except where explained below, and the same reference numerals are used to refer to similar features. It is also possible for the heating chamber 108 of the fifth embodiment to correspond to the heating chamber 108 of the second embodiment, e.g. with the channel 113 provided in the base 112 of the heating chamber 108, except as described below, and this forms a further embodiment of the disclosure.

However, it is noted that the heating chamber 108 of the fifth (and further) embodiment may in itself be a stand-alone embodiment, and may be combined with the features of embodiment six to achieve the benefits highlighted below. The method of manufacturing the heating chamber in the fifth embodiment may also be a stand-alone embodiment.

Figure 15:
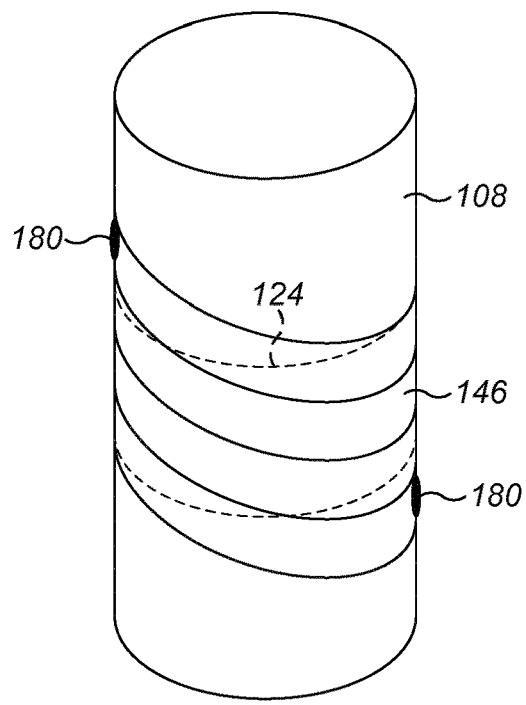
FIG. 15 shows an alternative configuration in which the heat shrink material forms a helix around the side wall of the heating chamber.

FIG. 15 shows an alternative configuration in which the heat shrink layer 146 forms a helix around the side wall 126 of the heating chamber 108. A first adhesive portion 180 may be positioned above the heater 124 (that is, towards the open end 110) and attached directly to the side wall 126. The heat shrink material 146 may be attached to this adhesive 180, and then may be wound around the side wall 126 toward the base 112 of the heating chamber 108. The heat shrink material 146 may extend past the heater 124 such that the bottom of the heat shrink material 146 is nearer the base 112 of the heating chamber 108. In the embodiment shown the heater 124 is entirely covered by the heat shrink material 146. The position of the heater 124 underneath the heat shrink material 146 is shown by the dashed lines in FIG. 15. A second portion of adhesive 180 may attach the heat shrink material 146 directly to the side wall 126 below the position of the heater 124 toward the base 112 of the heating chamber 108. When temperature is applied and the heat shrink material 146 shrinks, this fully encapsulates the heater 124 within the heat shrink material 146. The shrink of the heat shrink material 146 creates tension in the heat shrink material 146, thus attaching the heat shrink material 146 to the heating chamber 108.

Sixth Embodiment

A sixth embodiment is now described with reference to FIG. 16. The heating chamber 108 of the sixth embodiment may be identical to the heating chamber 108 of the first embodiment described with reference to FIGS. 1 to 6, except where explained below, and the same reference numerals are used to refer to similar features. It is also possible for the heating chamber 108 of the sixth embodiment to correspond to the heating chamber 108 of the second embodiment, e.g. with the channel 113 provided in the base 112 of the heating chamber 108, except as described below, and this forms a further embodiment of the disclosure.

However, it is noted that the heating chamber 108 of the sixth (and further) embodiment may in itself be a stand-alone embodiment. The method of manufacturing the heating chamber in the sixth embodiment may also be a stand-alone embodiment.

Figure 16:
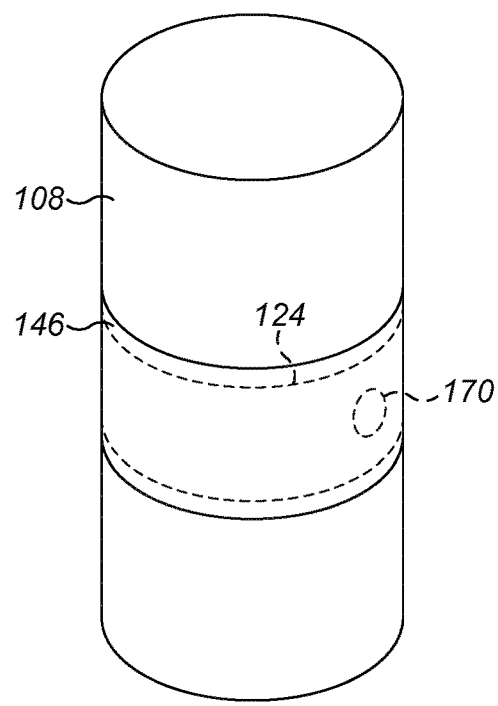
FIG. 16 shows a heating chamber with a heater attached, where the heater and a thermistor are encapsulated by the heat shrink material.

FIG. 16 shows a heating chamber 108 with a heater 124 attached, where the heater 124 and a temperature measurement device 170 are covered by the heat shrink material 146. The temperature measurement device 170 may be a thermocouple, or a thermometer, or a thermistor, or any other device for sensing temperature. For example, the temperature measurement device 170 may be a thermistor comprising a glass bead comprising a resistive element configured to change resistance when exposed to heat conducted by the glass. The change in resistance may then be used to determine the temperature of the glass, and therefore of the surroundings of the thermistor. The temperature measurement device 170 shown in FIG. 16 is a thermistor 170 situated between the heat shrink material 146 and the tubular structure. Preferably the thermistor (170) may be covered by the heat shrink material (146), and may be compressed by the heat shrink material (146) against the outwardly facing surface of the side wall (126) after the heat shrink material (146) has been heated. The thermistor 170 may however be provided within a recess created in the heating chamber 108 in alternative embodiments. The temperature measurement device 170 may be used to control the power delivered to the heater 124 in some embodiments to ensure the heating chamber 108 remains at the correct temperature for efficient use, and to increase the lifetime of the heating chamber 108, and the amount of time the device 100 will work on a single electrical charge.

Seventh Embodiment

A seventh embodiment is now described with reference to FIG. 17. The elements shown in FIG. 17 may interact with the heating chamber 108 of the first embodiment described with reference to FIGS. 1 to 6. However, it is noted that the interaction of the heat shrink material and heater shown in FIG. 17 with the heating chamber 108 may in itself form a stand-alone embodiment. The method of manufacturing the heating chamber in the seventh embodiment may also be a stand-alone embodiment.

It is also possible for the heating chamber 108 of the seventh embodiment to correspond to the heating chamber 108 of the second embodiment, e.g. with the channel 113 provided in the base 112 of the heating chamber 108, except as described below, and this forms a further embodiment of the disclosure.

Figure 17:
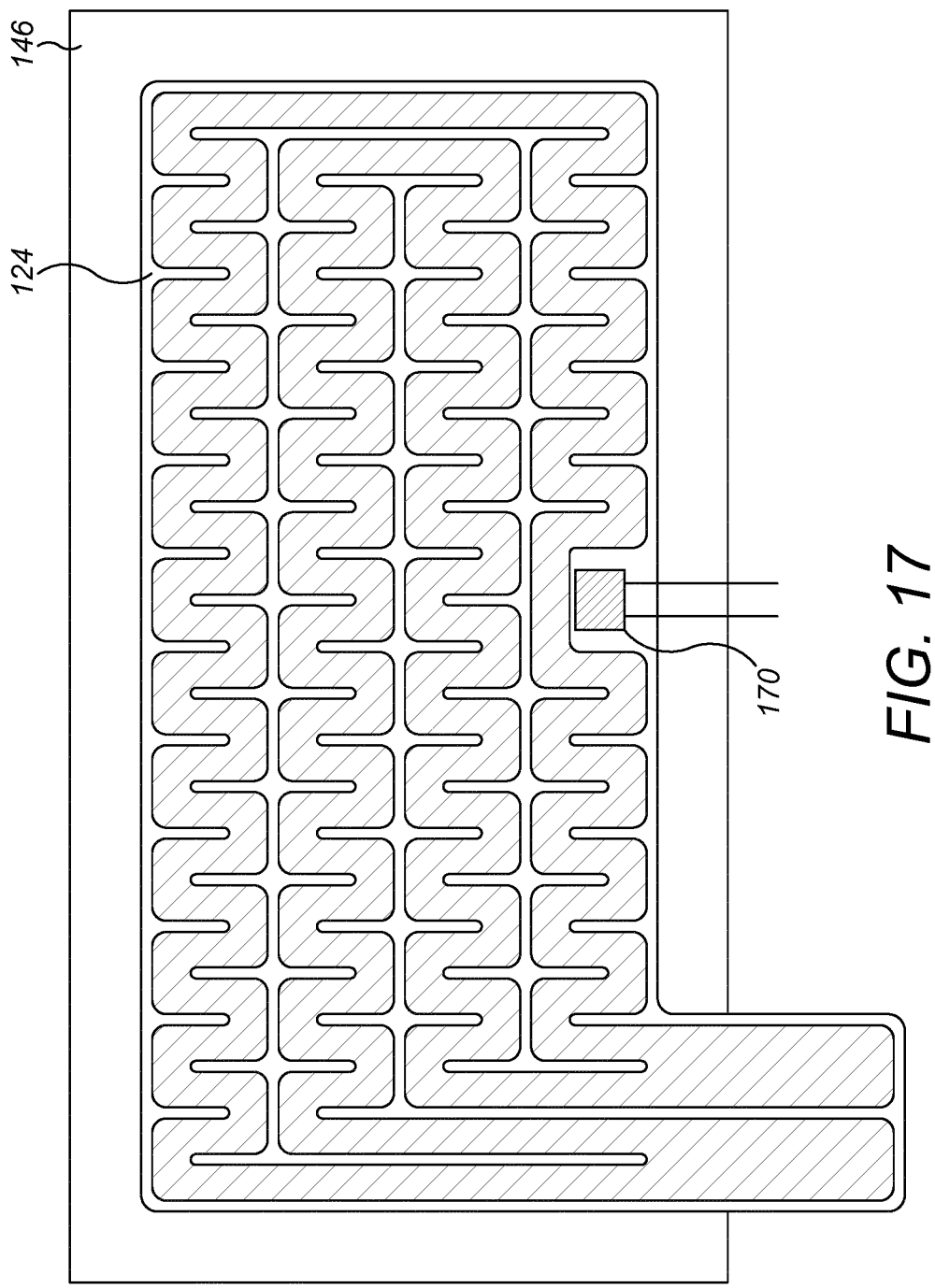
FIG. 17 shows the heat shrink layer heater attached to the outward facing side of the heater before being attached to the heating chamber.

FIG. 17 shows heater 124 attached to the heat shrink material 146. The heat shrink material is attached to the outward facing side of the heater. The heater 124 and the heat shrink material 146 may be attached by an adhesive layer, or any other suitable substance. This attachment in the seventh embodiment takes place before the heater is attached to the heating chamber 108. Therefore the arrangement of the heater 124 and heat shrink material 146 may subsequently be attached to the heating chamber 108 as a single piece. It is noted the method set out in the fourth embodiment may be performed after the method set out in the seventh embodiment.

Eighth Embodiment

An eighth embodiment is now described with reference to FIG. 18. The elements shown in FIG. 18 may interact with the heating chamber 108 of the first embodiment described with reference to FIGS. 1 to 6. However, it is noted that the interaction of the heat shrink material and heater shown in FIG. 18 with the heating chamber 108 may in itself form a stand-alone embodiment. The method of manufacturing the heating chamber in the eighth embodiment may also be a stand-alone embodiment.

It is also possible for the heating chamber 108 of the eighth embodiment to correspond to the heating chamber 108 of the second embodiment, e.g. with the channel 113 provided in the base 112 of the heating chamber 108, except as described below, and this forms a further embodiment of the disclosure.

Figure 18:
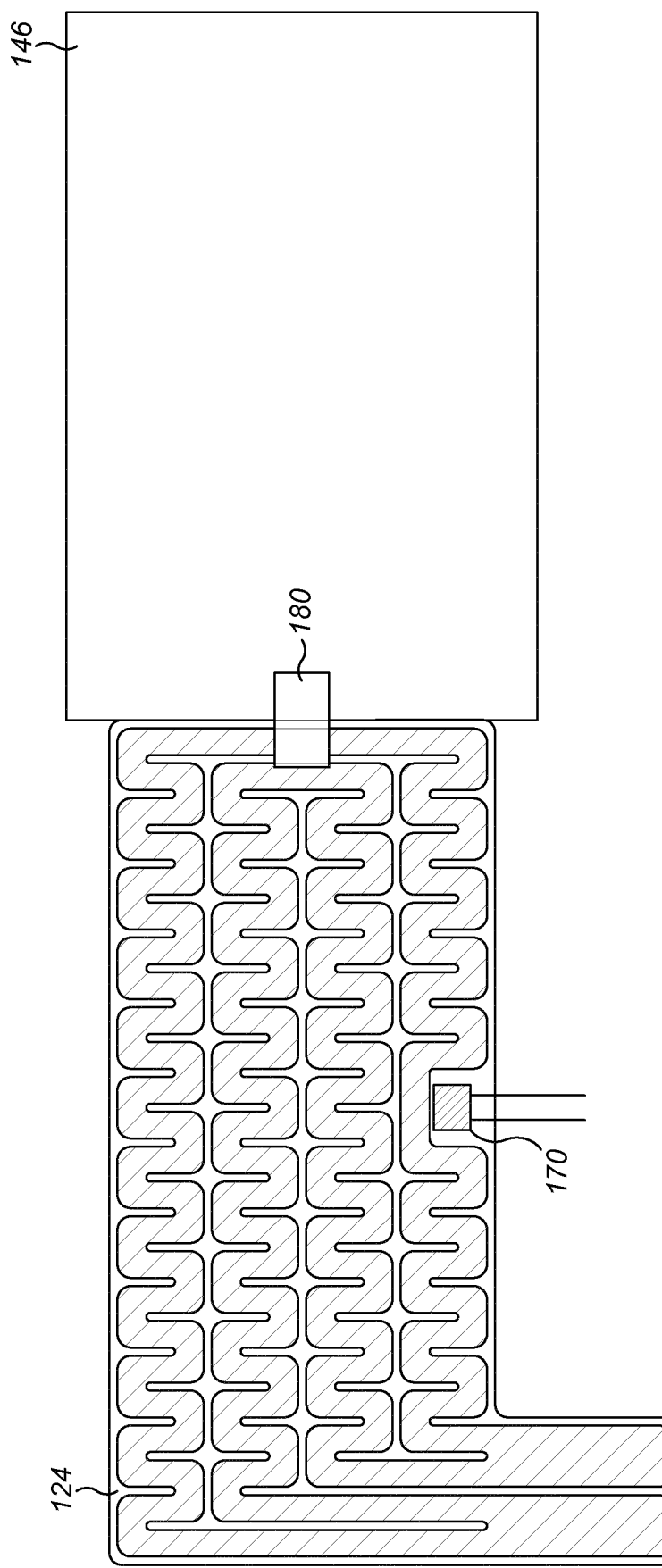
FIG. 18 shows the heat shrink layer and heater joined by adhesive tape in an end to end arrangement.

FIG. 18 shows a heater 124 attached to the heat shrink material 146 with adhesive tape 180. In one configuration the adhesive tape 180 may be stuck to the inward facing side of the heater 124 (the face in contact with the heating chamber 108 when the heater is applied to the heating chamber 108) such that the adhesive tape 180 is gripped by the heater 124 and heat shrink material 146 when the heat shrink material is heated such that it contracts in the length direction. It is noted in other configurations the adhesive tape 180 could be stuck to the outward facing side of the heater 124. The heater 124 and the heat shrink layer 146 are attached in an end to end arrangement, whereby the end of the heater is attached to the end of the heat shrink material. The heater may in some configurations have a further piece of adhesive tape 180 attached to the other end of the heater. Other suitable materials may be used instead of adhesive tape 180. The other end of the heater may be configured to attach to the heating chamber side wall 126. The heater 124 and the heat shrink material 146 may then be attached to the heating chamber 108 as a single piece. For example, the heater 124 and heat shrink material 146 may be wound around the heating chamber 108 to attach the heater 124 and heat shrink material 146 to the heating chamber 108. It is noted the method set out in the fourth embodiment may be performed after the method set out in the eighth embodiment.

Definitions and Alternative Embodiments

It will be appreciated from the description above that many features of the different embodiments are interchangeable with one another. The disclosure extends to further embodiments comprising features from different embodiments combined together in ways not specifically mentioned.

FIGS. 11 to 16 show the heating chamber 108 separated from the aerosol generation device 100. This is to highlight that the advantageous features described for the design of the heating chamber 108 are independent of the other features of the aerosol inhalation device 100. In particular, the heating chamber 108 finds many uses, not all of which are tied to the aerosol generation device 100 described herein. Such designs may benefit from the improved thermal contact between a heater 124 and the heating chamber 108 provided by the compressive force generated by the heat shrink material 146. Such uses are advantageously provided with the heating chamber 108 described herein.

Note that since the heater 124 is usually formed from a resistive metallic pathway 164 sandwiched between two electrically insulating layers 166 (e.g. polyimide film), a variant on the designs described above can be that one or both of the polyimide layers 166 in the heater is a heat shrink material, such as those described above. This results in a reduced thermal mass, since the need for additional layers is avoided. In some examples of this variant, the heater is provided with only a backing layer, but no covering layer, allowing a heat shrink layer 146 to be wrapped around the heater 124 in the assembly process in the manner described above. In some cases it may be advantageous to provide both a backing layer and a top layer as a heat shrink material 146 to allow both layers to contract together, which can help to avoid ruffling of the heater and promote good thermal contact between the heater 124 and the side wall 126. In other examples, only one of the polyimide layers need be formed from a heat shrink material to provide the desired shrinking effects.

In some examples, the heater 124 may be used to supply heat to the heat shrink material 146 to cause shrinkage. This can provide an evenly distributed supply of heat to the heat shrink material 146, so promoting isotropic shrinkage. For example, this could be performed as part of a testing and/or diagnostic phase of the heater 124, control circuitry 122 and/or power source 120.

In all cases, the heat shrink layer 146 may be wrapped around the side wall 126 more than one full rotation. For example two full rotations or more may be included in some embodiments. Full rotations can be assessed at any convenient point, but it may be convenient to determine that a full rotation has occurred if the (or each) position where the heater 124 is in thermal contact with the side wall 126 has a layer of heat shrink material 146 layered outside the heater 124. Similarly two full rotations have occurred if the (or each) position where the heater 124 is in thermal contact with the side wall 126 has two layers of heat shrink material 146 layered consecutively outside the heater 124.

The term "heater" should be understood to mean any device for outputting thermal energy sufficient to form an aerosol from the aerosol substrate 128. The transfer of heat energy from the heater 124 to the aerosol substrate 128 may be conductive, convective, radiative or any combination of these means. As non-limiting examples, conductive heaters may directly contact and press the aerosol substrate 128, or they may contact a separate component which itself causes heating of the aerosol substrate 128 by conduction, convection, and/or radiation. Convective heating may include heating a liquid or gas which consequently transfers heat energy (directly or indirectly) to the aerosol substrate.

Radiative heating includes, but is not limited to, transferring energy to an aerosol substrate 128 by emitting electromagnetic radiation in the ultraviolet, visible, infrared, microwave or radio parts of the electromagnetic spectrum. Radiation emitted in this way may be absorbed directly by the aerosol substrate 128 to cause heating, or the radiation may be absorbed by another material such as a susceptor or a fluorescent material which results in radiation being re-emitted with a different wavelength or spectral weighting. In some cases, the radiation may be absorbed by a material which then transfers the heat to the aerosol substrate 128 by any combination of conduction, convection and/or radiation.

Heaters may be electrically powered, powered by combustion, or by any other suitable means. Electrically powered heaters may include resistive track elements (optionally including insulating packaging), induction heating systems (e.g. including an electromagnet and high frequency oscillator), etc. The heater 128 may be arranged around the outside of the aerosol substrate 128, it may penetrate part way or fully into the aerosol substrate 128, or any combination of these.

The term "temperature sensor" is used to describe an element which is capable of determining an absolute or relative temperature of a part of the aerosol generation device 100. This can include thermocouples, thermopiles, thermistors and the like. The temperature sensor may be provided as part of another component, or it may be a separate component. In some examples, more than one temperature sensor may be provided, for example to monitor heating of different parts of the aerosol generation device 100, e.g. to determine thermal profiles.

The control circuitry 122 has been shown throughout as having a single user operable button 116 to trigger the aerosol generation device 100 to turn on. This keeps the control simple and reduces the chances that a user will misuse the aerosol generation device 100 or fail to control the aerosol generation device 100 correctly. In some cases, however, the input controls available to a user may be more complex than this, for example to control the temperature, e.g. within pre-set limits, to change the flavour balance of the vapour, or to switch between power saving or quick heating modes, for example.

With reference to the above-described embodiments, aerosol substrate 128 includes tobacco, for example in dried or cured form, in some cases with additional ingredients for flavouring or producing a smoother or otherwise more pleasurable experience. In some examples, the aerosol substrate 128 such as tobacco may be treated with a vaporising agent. The vaporising agent may improve the generation of vapour from the aerosol substrate. The vaporising agent may include, for example, a polyol such as glycerol, or a glycol such as propylene glycol. In some cases, the aerosol substrate may contain no tobacco, or even no nicotine, but instead may contain naturally or artificially derived ingredients for flavouring, volatilisation, improving smoothness, and/or providing other pleasurable effects. The aerosol substrate 128 may be provided as a solid or paste type material in shredded, pelletised, powdered, granulated, strip or sheet form, optionally a combination of these. Equally, the aerosol substrate 128 may be a liquid or gel. Indeed, some examples may include both solid and liquid/gel parts.

Consequently, the aerosol generation device 100 could equally be referred to as a "heated tobacco device", a "heat-not-burn tobacco device", a "device for vaporising tobacco products", and the like, with this being interpreted as a device suitable for achieving these effects. The features disclosed herein are equally applicable to devices which are designed to vaporise any aerosol substrate.

The embodiments of the aerosol generation device 100 are described as being arranged to receive the aerosol substrate 128 in a pre-packaged substrate carrier 114. The substrate carrier 114 may broadly resemble a cigarette, having a tubular region with an aerosol substrate arranged in a suitable manner. Filters, vapour collection regions, cooling regions, and other structure may also be included in some designs. An outer layer of paper or other flexible planar material such as foil may also be provided, for example to hold the aerosol substrate in place, to further the resemblance of a cigarette, etc.

As used herein, the term "fluid" shall be construed as generically describing non-solid materials of the type that are capable of flowing, including, but not limited to, liquids, pastes, gels, powders and the like. "Fluidized materials" shall be construed accordingly as materials which are inherently, or have been modified to behave as, fluids. Fluidization may include, but is not limited to, powdering, dissolving in a solvent, gelling, thickening, thinning and the like.

As used herein, the term "volatile" means a substance capable of readily changing from the solid or liquid state to the gaseous state. As a non-limiting example, a volatile substance may be one which has a boiling or sublimation temperature close to room temperature at ambient pressure. Accordingly "volatilize" or "volatilise" shall be construed as meaning to render (a material) volatile and/or to cause to evaporate or disperse in vapour.

As used herein, the term "vapour" (or "vapor") means: (i) the form into which liquids are naturally converted by the action of a sufficient degree of heat; or (ii) particles of liquid/moisture that are suspended in the atmosphere and visible as clouds of steam/smoke; or (iii) a fluid that fills a space like a gas but, being below its critical temperature, can be liquefied by pressure alone.

Consistently with this definition the term "vaporise" (or "vaporize") means: (i) to change, or cause the change into vapour; and (ii) where the particles change physical state (i.e. from liquid or solid into the gaseous state).

As used herein, the term "atomise" (or "atomize") shall mean: (i) to turn (a substance, especially a liquid) into very small particles or droplets; and (ii) where the particles remain in the same physical state (liquid or solid) as they were prior to atomization.

As used herein, the term "aerosol" shall mean a system of particles dispersed in the air or in a gas, such as mist, fog, or smoke. Accordingly the term "aerosolise" (or "aerosolize") means to make into an aerosol and/or to disperse as an aerosol. Note that the meaning of aerosol/aerosolise is consistent with each of volatilise, atomise and vaporise as defined above. For the avoidance of doubt, aerosol is used to consistently describe mists or droplets comprising atomised, volatilised or vaporised particles. Aerosol also includes mists or droplets comprising any combination of atomised, volatilised or vaporised particles.

The invention claimed is:

1. A method of constructing a heating chamber for an aerosol generation device comprising the steps of:
    providing aside wall of the heating chamber;
    providing a heater;
    arranging the heater to be in thermal contact with the side wall of the heating chamber;
    attaching a heat shrink layer to an outward facing side of the heater;
    heating the heat shrink layer to a temperature such that the heat shrink layer contracts to compress the heater against the side wall.

2. The method of claim 1, wherein the heat shrink layer is a layer of heat shrink tape wrapped around the side wall.

3. The method of claim 2, wherein the heat shrink layer contracts only along a length of the tape in response to heating.

4. The method of claim 1, wherein the heat shrink layer wraps around the heater, and wherein after heating, the heat shrink layer conforms to a shape of the side wall and the heater.

5. The method of claim 4, wherein after heating, the heat shrink layer exerts a homogeneous force on the heater.

6. The method of claim 1, wherein the step of heating the heat shrink layer results in between 5% and 12% contraction in length.

7. The method of claim 1, wherein the heat shrink layer is attached to the heater using a silicone adhesive or a silicone adhesive based tape.

8. The method of claim 7, wherein the step of heating the heat shrink layer comprises heating the heat shrink layer to a temperature not higher than a melting point of the silicone adhesive so as to cause the heat shrink layer to contract, and then further heating the heat shrink layer to an operational temperature of the device.

9. The method of claim 1, wherein the steps of arranging the heater to be in thermal contact with the side wall, and attaching the heat shrink layer to the outward facing side of the heater comprises first attaching the heat shrink layer to the heater, and then attaching a combination of the heat shrink layer and the heater to the side wall.

10. The method of claim 8, wherein an end of the heat shrink layer is attached to an end of the heater using adhesive tape, or wherein the outward facing side of the heater is attached to an inward facing side of the heat shrink layer using an adhesive layer.

11. The method of claim 1, wherein the step of attaching the heat shrink layer to the heater comprises wrapping the heat shrink layer at least two full rotations around the side wall, at a position where the heater is in thermal contact with the side wall.

12. A heating chamber produced in accordance with the method of claim 1.

13. A heating chamber for an aerosol generation device, the heating chamber comprising:
    a side wall defining an interior volume of the heating chamber;
    a heater in thermal contact with the side wall; and
    a heat shrink layer under tension, compressing the heater against an outwardly facing surface of the side wall.

14. The heating chamber of claim 13, wherein the heat shrink layer is wrapped around the side wall for at least two full rotations at a position where the heater is in thermal contact with the side wall.

15. The heating chamber of claim 13, wherein the side wall and the heat shrink layer together hermetically seal the heater.

16. The heating chamber of claim 13, wherein the side wall is tubular and the heat shrink layer extends all the way around the outwardly facing surface of the side wall.

17. The heating chamber of claim 13, wherein the heat shrink layer is a layer of heat shrink tape wrapped around the side wall.

18. The heating chamber of claim 17, wherein the heat shrink layer is configured to contract only along a length of the tape in response to heating.

19. The heating chamber of claim 13, wherein the heat shrink layer comprises polyimide.

20. The heating chamber of claim 13, wherein the heat shrink layer has a thickness of 50 μm or less.

21. The heating chamber of claim 13, wherein the heat shrink layer has a thermal conductivity lower than that of the side wall.

22. The heating chamber of claim 13, further comprising a thermistor, and wherein the thermistor is covered by the heat shrink material and wherein the heat shrink material compresses the thermistor against the outwardly facing surface of the side wall.

23. An aerosol generation device, comprising:
    an electrical power source;
    the heating chamber according to claim 13; and
    control circuitry arranged to control a supply of electrical power from the electrical power source to the heater.

* * * * *